United States Patent [19]
Stacey

[11] Patent Number: 5,515,264
[45] Date of Patent: May 7, 1996

[54] OPTIMIZED HIGH POWER VOLTAGE SOURCED INVERTER SYSTEM

[75] Inventor: Eric J. Stacey, Pittsburgh, Pa.

[73] Assignee: Electric Power Research Institute, Inc., Palo Alto, Calif.

[21] Appl. No.: 447,034

[22] Filed: May 22, 1995

Related U.S. Application Data

[63] Continuation of Ser. No. 207,230, Mar. 7, 1994, abandoned, which is a continuation of Ser. No. 881,405, May 11, 1992, abandoned.

[51] Int. Cl.$^6$ ................................................. H02M 7/5387
[52] U.S. Cl. ............................... 363/132; 363/41; 363/64; 363/71
[58] Field of Search .................................. 363/5, 39, 40, 363/41, 43, 64, 71, 132; 323/361; 307/105

[56] References Cited

U.S. PATENT DOCUMENTS

| | | | |
|---|---|---|---|
| 3,168,692 | 2/1965 | Lilienstein | 363/5 |
| 3,191,010 | 6/1965 | Tripp et al. | 341/113 |
| 3,290,578 | 12/1966 | Ainsworth | 363/39 |
| 3,370,215 | 2/1968 | Light | 363/160 |
| 3,571,722 | 3/1971 | Vendelin | 325/445 |
| 3,611,085 | 10/1971 | Rosenberry, Jr. | 318/225 R |
| 3,624,488 | 11/1971 | Rabut | 321/26 |

(List continued on next page.)

OTHER PUBLICATIONS

Schaefer, Johannes, *Rectifier Circuits* (John Wiley & Sons, 1965) p. 57.

Honbu, Mitsuyuki, et al., "Parallel Operation Techniques of GTO Inverter Sets for Large AC Motor Drives," *IEEE Transactions on Industry Applications*, vol. IA–19, No. 2, Mar./Apr. 1983, pp. 198–205.

Wilson, J. W. A., "Double Bridge Inverters with Magnetic Coupling—Part 1: Voltage Waveforms" and Double Bridge Inverters with Magnetic Coupling—Part 2: Current Waveforms, *Conference Record of IEEE–IAS Annual Meeting* (1976), pp.1107–1119.

Appendix A, FIGS. 2 and 3: Eric J. Stacey, "Advanced Static VAR Compensators Report: Power Circuit Configuration," (Westinghouse), viewgraphs from a presentation of this paper on May 10, 1990, Eric J. Stacey showing the zero sequence blocking transformer disclosed in Stacey's U.S. Pat. No. 4,870,557 of record, as annotated by the above-named inventor to show the location of the high voltage bushings.

Appendix A, FIGS. 4 and 5: Drawings of known prior art systems made by William McMurray while under contract to the assignee of the above-identified application in Jul. 1990.

L. H. Walker, "10 MW GTO Converter for Battery Peaking Service", IEEE transactions on Industry Applications, vol. IA–26, No. 1, 1990, pp. 62–72.

A. J. Humphrey and B. Mokrytzki, "Inverter Paralleling Reactors," Conference Record of IEEE International Semiconductor Power converter Conference, May 1972, pp. 2–4–1 to 2–4–6.

*Primary Examiner*—Peter S. Wong
*Assistant Examiner*—Adolf Berhane
*Attorney, Agent, or Firm*—Flehr, Hohbach, Test, Albritton & Herbert

[57] ABSTRACT

A voltage sourced inverter system includes an inverter for coupling to a DC power source and an interphase transformer bank coupled to the inverter. The inverter includes a number of poles for providing discretely displaced voltage waveforms to the interphase transformer bank. A main transformer operably coupled to the interphase transformer bank transforms power therefrom into an AC power output. The interphase transformer bank may be a singular stage or a hierarchial arrangement of plural interphase transformers which combine the discretely displaced voltage waveforms to reduce selected harmonic components therefrom. The inverter may provide notched waveforms to remove additional selected harmonics from the discretely displaced voltage waveforms. A method of inverting DC power into AC power with reduced selected harmonic components is also disclosed.

9 Claims, 21 Drawing Sheets

U.S. PATENT DOCUMENTS

| | | | |
|---|---|---|---|
| 3,628,123 | 12/1971 | Rosa | 363/64 |
| 3,671,901 | 6/1972 | Lys | 336/5 |
| 3,710,135 | 1/1973 | Gilbert | 307/88 R |
| 3,792,286 | 2/1974 | Meier | 307/58 |
| 3,876,923 | 4/1975 | Humphrey et al. | 363/43 |
| 3,882,437 | 5/1975 | Geller | 336/123 |
| 3,958,173 | 5/1976 | Christianson et al. | 321/45 C |
| 4,021,721 | 5/1977 | Tachibana | 321/47 |
| 4,066,938 | 1/1978 | Turnbull | 318/227 |
| 4,122,515 | 10/1978 | Tachibana et al. | 363/45 |
| 4,204,264 | 5/1980 | Lipman | 363/71 |
| 4,225,914 | 9/1980 | Hirata et al. | 363/160 |
| 4,263,642 | 4/1981 | Simmons et al. | 363/17 |
| 4,366,532 | 12/1982 | Rosa et al. | 363/69 |
| 4,581,573 | 4/1986 | Dobsa et al. | 323/356 |
| 4,656,412 | 4/1987 | McLynan | 320/639 |
| 4,661,877 | 4/1987 | Usui | 361/36 |
| 4,680,531 | 7/1987 | Reg et al. | 323/206 |
| 4,684,875 | 8/1987 | Powel | 323/204 |
| 4,686,431 | 8/1987 | Skelton | 315/399 |
| 4,692,851 | 9/1987 | Attwood | 363/16 |
| 4,725,938 | 2/1988 | Onodera | 363/28 |
| 4,750,098 | 5/1988 | Heinrich et al. | 363/10 |
| 4,758,386 | 7/1988 | Fanning | 264/1.5 |
| 4,779,181 | 10/1988 | Traver et al. | 363/154 |
| 4,795,959 | 1/1989 | Cooper | 323/308 |
| 4,802,079 | 1/1989 | Mizoguchi | 363/71 |
| 4,808,891 | 2/1989 | Watanuki et al. | 315/411 |
| 4,812,669 | 3/1989 | Takeda et al. | 307/105 |
| 4,831,352 | 5/1989 | Sokai et al. | 336/12 |
| 4,847,745 | 7/1989 | Shekhawat et al. | 363/132 |
| 4,862,112 | 8/1989 | Singh | 331/107 SL |
| 4,870,557 | 9/1989 | Stacey | 363/43 |
| 4,904,945 | 2/1990 | Kouan et al. | 324/547 |
| 4,975,822 | 12/1990 | Lipman | 363/40 |
| 5,138,544 | 8/1992 | Jessee | 363/43 |
| 5,168,437 | 12/1992 | Gyugyi et al. | 363/42 |
| 5,212,629 | 5/1993 | Jesse | 363/42 |
| 5,446,642 | 8/1995 | McMurray | 363/40 |
| 5,446,643 | 8/1995 | McMurray | 363/40 |

FIG. 23
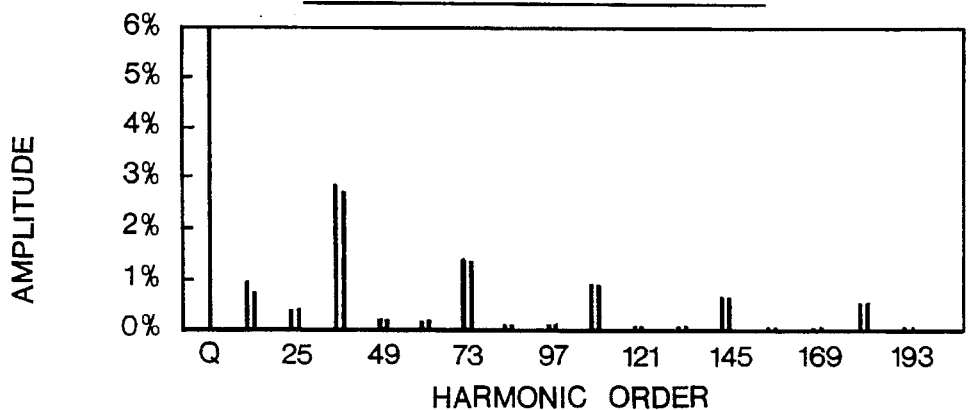
FIG. 12
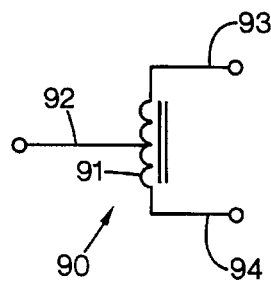
FIG. 31
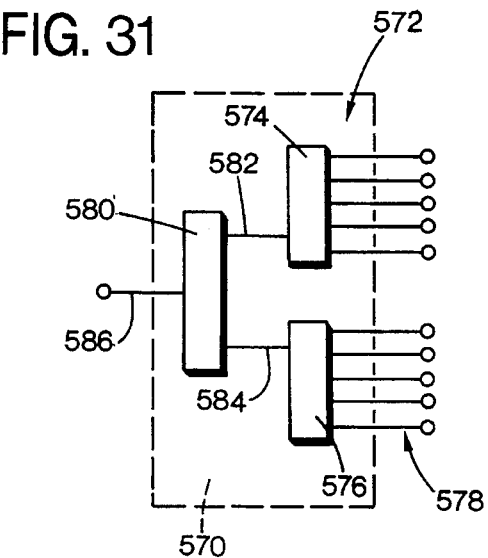
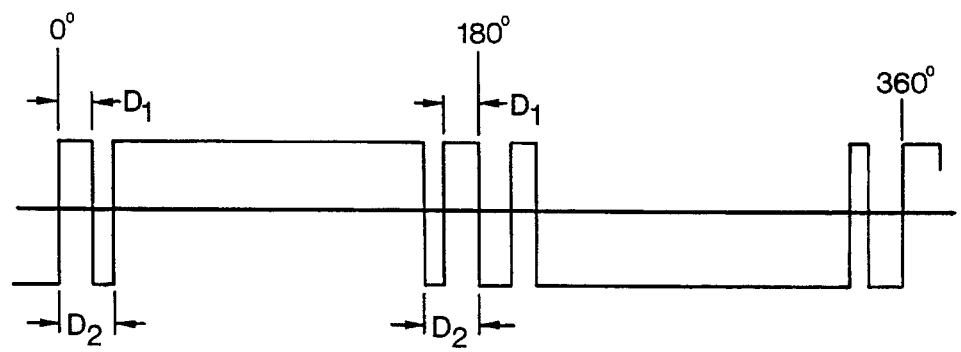
FIG. 36

48 - PULSE QHNI VOLTAGE WAVEFORM

HARMONIC SPECTRUM
OF 48 - PULSE QHNI VOLTAGE (EQUAL DISPLACEMENTS)

72-PULSE QHNI SYSTEM

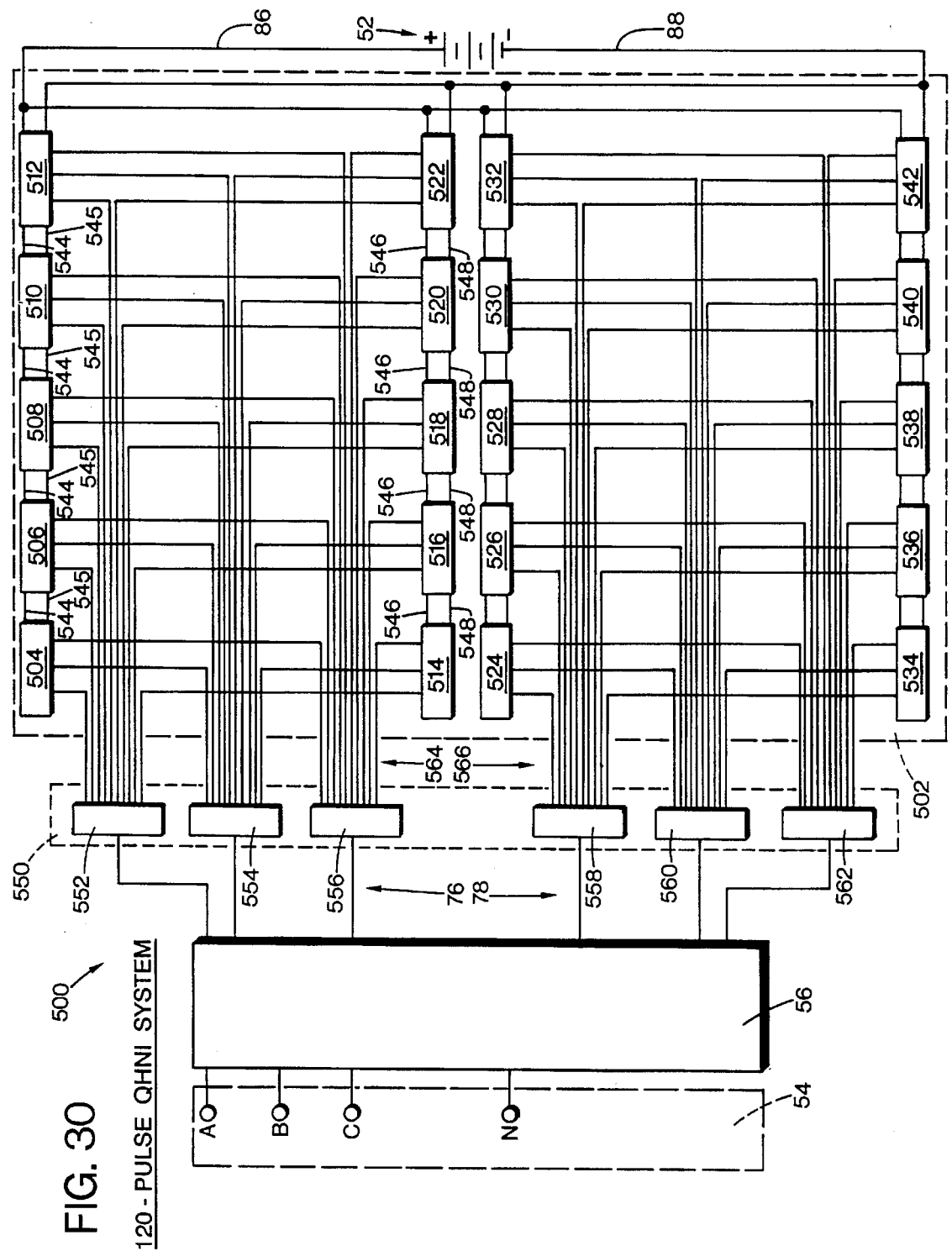

120 - PULSE QHNI VOLTAGE WAVEFORM

HARMONIC SPECTRUM OF 120 - PULSE QHNI VOLTAGE

OPTIMIZED HIGH POWER VOLTAGE SOURCED INVERTER SYSTEM

This is a continuation of application Ser. No. 08/207,230 filed Mar. 7, 1994, now abandoned, which is a continuation of application of application Ser. No. 07/881,405 filed May 11, 1992, now abandoned.

BACKGROUND OF THE INVENTION

The present invention relates generally to inverter configurations, such as may be used for an advanced static VAR (volt-amperes-reactive) compensator (ASVC) for power systems, and more particularly to an apparatus and method for providing quasi-harmonic neutralization in voltage sourced static inverter systems by combining outputs from multiple sets of phase displaced inverter outputs. Other uses for these inverter systems currently include airborne power systems, space stations, power supply inverters, generation of controllable leading or lagging reactive current, industrial drives, various military applications requiring high quality power, power conditioning, and DC link frequency conversion.

In such applications, three phase static inverters typically employ semiconductor switching devices arranged in a 6-pulse bridge configuration consisting of three inverter poles connected across a DC voltage source. In low power applications, high quality sinusoidal output waveforms are obtained using fast switching transistors with high frequency switching or pulse width modulation techniques. In higher power applications, such high frequency switching becomes less efficient, so high quality output voltage waveforms are obtained using programmed waveform techniques with a reduced number of switchings in each fundamental period.

For example, conventional harmonic neutralized inverters, such as those used in advanced static VAR generators, employ many large semiconductor switches and a high efficiency, so the switches are operated at fundamental frequency using special transformer configurations for harmonic neutralization. The outputs from a number of inverter stages, each operating at fundamental frequency, are combined to produce a high quality multi-step output waveform. This output waveform has each step evenly spaced with an amplitude proportional to the sine of the angular position. The number of steps in the output voltage waveform is referred to as the "pulse number." In the typical multi-step or multi-pulse inverter, each switching device contributes equally to the output while operating with identical voltage and current waveforms. Since each switch turns on and off at the same current level and operates with similar delays, the effect upon the output waveform of differences in current-dependent switching delays are minimized.

The 6-pulse bridge, which is simplest of the three phase harmonic neutralized inverters, has three inverter poles, each having two switching devices connected in series with the junction of the switches being the AC output terminal. Each inverter pole operates at fundamental frequency, so three square wave outputs are produced with respect to the midpoint of the DC voltage. These three square wave outputs are symmetrically displaced by 120°. Thus, every 60° a pole transition occurs so there are six state changes in a single cycle of the fundamental frequency. At the three AC terminals, the output voltages are true 6-pulse waveforms. The basic 6-pulse bridge inverter requires no transformer and is generally used as the basic building block to construct higher pulse number inverters.

True harmonic neutralized outputs having a pulse number of (N×6) are produced by combining the outputs of N 6-pulse bridges, with each of the 6-pulse bridges being coupled to a common DC source. Each bridge output is incrementally phase displaced from the preceding output by an angle of 360°/6N. To shift the fundamental outputs of individual 6-pulse bridges into phase with one another, special individual transformers having appropriate winding configurations and identical voltage ratios are required. The transformed outputs are combined, either by placing all of the transformer secondaries in series (in inverter terminology, the "secondaries" are the windings on the AC output side of the transformer, with the primary windings being coupled to the inverter), by parallel connection through appropriate additional interphase transformers, or by some combination of these series and parallel connection schemes.

To derive the necessary phase shifts to combine the output waveforms, the individual transformers must have differently configured windings for each 6-pulse building block. In practical transformers, integer turns must be used to obtain the required phase shifts. This imposes limitations on the desired ratios which may be obtained, so accurate incremental phase shifts may not be possible with transformers having a low number of winding turns. For example, a 72-pulse system needs twelve different transformers, each having a unique turns ratio and configuration, to provide true harmonic neutralization. Although significant improvement in waveform quality is obtainable using higher pulse numbers, the increased complexity and cost of the special transformers cannot be justified for most applications. So typically, the tradeoff between waveform quality and initial cost is weighted toward simple winding configurations and low pulse numbers. The highest pulse number typically employed is twelve, using special transformers with combinations of wye and delta windings.

In the past, to obtain high quality AC output waveforms and high efficiency from large inverters, it has been traditional to employ harmonic neutralizing techniques. As described above, one typical harmonic neutralizing technique combines the outputs from a number of individual 6-pulse bridges or inverter stages operating at a fundamental frequency using a multitude of different phase-shifting transformers. Such an arrangement allows the fundamental components of the output voltages to sum directly, while the undesirable and dominant harmonic components cancel out one another. However, to obtain an output waveform of acceptable quality for most power system utility applications, without adding harmonic filters, a pulse number of at least thirty-six is required.

For example, a classical 36-pulse inverter has six 6-pulse bridges and six corresponding specially designed different phase-shifting transformers. Each inverter stage is displaced from the preceding stage by 10° (=360°÷36, where 36=6N= 6×6). Alternatively, the same effect is achieved with more complex transformer structures, such as transformers having multiple windows. One significant drawback to each of these earlier approaches is the initial equipment expense, as well as the high operating cost incurred in heating ($I^2R$) losses and the like.

Several simplified configurations for multi-pulsed voltage sourced inverters have recently evolved. These configurations employ different techniques to produce quasi-harmonic neutralized output waveforms using only one or two three phase transformers for 24-pulse outputs. One example of such an arrangement is disclosed in U.S. Pat. No. 4,870,557 to Eric J. Stacey, an inventor of the invention illustrated below.

3

Thus, a need exists for an improved high power voltage sourced inverter system, such as may be used to provide improved quasi-harmonic neutralization in voltage sourced static inverter systems, which is directed toward overcoming, and not susceptible to, the above limitations and disadvantages.

SUMMARY OF THE INVENTION

According to one aspect of the present invention, a voltage sourced inverter system includes a harmonic reducing device, such as plural interphase transformers coupled to an inverter for coupling to a DC power source. The inverter has a number of poles providing discretely displaced inverter output voltage waveforms to the interphase transformers. A main transformer transforms power from the interphase transformers to provide an AC power output of the inverter system. The interphase transformers may be arranged in a single stage or in a hierarchial arrangement to combine the discretely displaced inverter output voltage waveforms to reduce selected harmonic components from the AC power output. To block additional undesirable harmonics, such as fifth and seventh harmonic components, various types of harmonic blockers may be coupled between the main transformer and the inverter. Alternatively, additional undesirable harmonics may be eliminated by operating the inverter to provide notched output waveforms to the interphase transformers.

According to another aspect of the present invention, a method of inverting DC power into AC power to reduce selected harmonic components from the AC power output is provided.

An overall object of the present invention is to provide an improved inverter and voltage sourced inverter system realizing good device utilization, high reliability, low losses, low costs, and a high quality output waveform.

A further object of the present invention is to provide an improved inverter and voltage sourced inverter system which is simpler than earlier designs, yet provides comparable or improved neutralization of undesirable harmonic components.

An additional object of the present invention is to provide an improved voltage sourced inverter system which has low life cycle costs.

Another object of the present invention is to provide an improved method of inverting DC power into AC power having reduced selected harmonics.

Still another object of the present invention is to provide an improved method of generating from a DC power source an AC power output having neutralized selected harmonics.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIGS. 12–18 are schematic diagrams illustrating different forms of various interphase transformers (IPTs) of the present invention, with FIGS. 12 and 13 showing alternate representations of a center tapped IPT, FIG. 14 showing a modular two input IPT, FIG. 15 showing a modular three input IPT, FIG. 16 showing a zig-zag three input IPT, FIG. 17 showing a multi-section modular input IPT, and FIG. 18 showing a multi-section zig-zag input IPT;

FIG. 23 is a graph of the harmonic spectrum of the output voltage of the 36-pulse QHNI system of FIG. 22;

FIG. 30 is a schematic block diagram of one form of a 120-pulse QHNI system of the present invention;

FIG. 31 is a block diagram of one form of a two-stage IPT of the present invention;

FIG. 36 is a graph of an alternate harmonic reducing notched output voltage waveform which may be produced using the QHNI systems of FIGS. 19, 22, 24, 27, 30, 34 and 35.

DETAILED DESCRIPTION OF THE PREFERRED EMBODIMENTS

Figure 1:
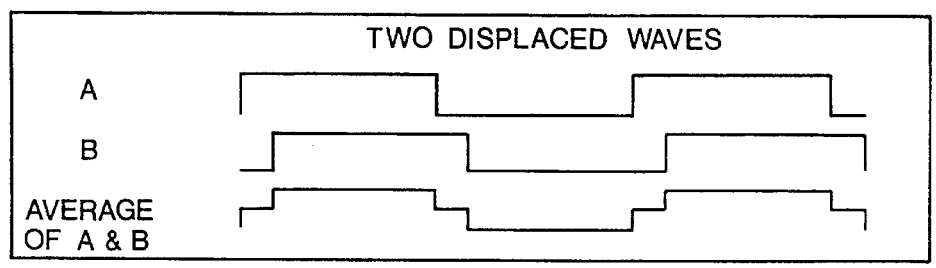
FIG. 1 are graphs of two displaced waves and their average.

Regarding terminology concerning the transformers described herein, the terminology of inverter engineers is used. The primary windings are on the inverter side of the system, and the secondary windings are on the line or AC output side of a transformer. This is opposite from the utility engineer's practice of referring to the windings connected to the line side as the primaries. Also, the term "inverter" is understood to mean an inverter or its functional equivalent capable of carrying current in both directions between an AC power side and a DC power side. The term "voltage sourced inverter" refers to the characteristic of an inverter being fed DC power from a voltage source, such as a battery, as opposed to a current source, such as an inductor. In contrast, the term "converter" refers to a type of current source device providing current flow therethrough in only one direction, such as those devices commonly used with DC transmission systems. When the term "coupled" is used herein, it is understood to mean "operably coupled" such that the coupling may occur directly or indirectly through other devices, such as breakers or fuses.

In the schematic diagrams herein, two types of conventional dot notations are used. The first notation is for intersecting conductors, and the second relates to the transformers. First, overlapping or intersecting conductors are electrically coupled together only if a dot is placed over their intersection. Overlapping conductors without a dot at their intersection are insulated from one another. For the second type of dot convention, the dots are located adjacent the transformer windings to represent the instantaneous voltage polarity of the transformer windings.

Many new applications are emerging for very high power voltage sourced inverters employing solid state semiconductor switching devices, such as gate turn-off thyristors (GTOs). For very large inverters, many semiconductor switches are required to handle the power flow. To be economically and technically competitive, these very large inverters may be designed to realize good device utilization, high reliability, low losses, low costs, and a high quality output voltage waveform. To reduce the complexity from that of the earlier inverters described above, extensive efforts have been applied toward developing the new techniques and systems described herein for harmonic neutralization with simplified transformer configurations. The configurations described below are reliable, have low life cycle costs, and provide output waveforms meeting desired technical specifications.

When pulse numbers higher than the 12-pulse outputs previously proposed are required, the new technique described below to neutralize harmonics at the main transformer primaries can be effectively combined with conventional 6-pulse or 12-pulse (or higher) inverter configurations to obtain the characteristics of classical higher pulse number configurations. This new technique described herein employs special interphase transformers (IPTs) to combine outputs from a number of discretely displaced inverter stages feeding a classical 6-pulse or 12-pulse transformer configuration. This discrete displacement of outputs from the inverter poles may be an equal displacement, such as three sets of outputs, each lagging the preceding waveform by 10° (see FIG. 22). For example, two sets of three outputs may be combined, with each of the three outputs each lagging the preceding waveform by 10°, and the two sets being displaced from one another by 15° (see FIG. 27). The outputs are combined so that the dominant harmonics normally present in the composite transformer outputs are neutralized before they reach the transformer primaries.

Combining Waveforms

Figure 2:
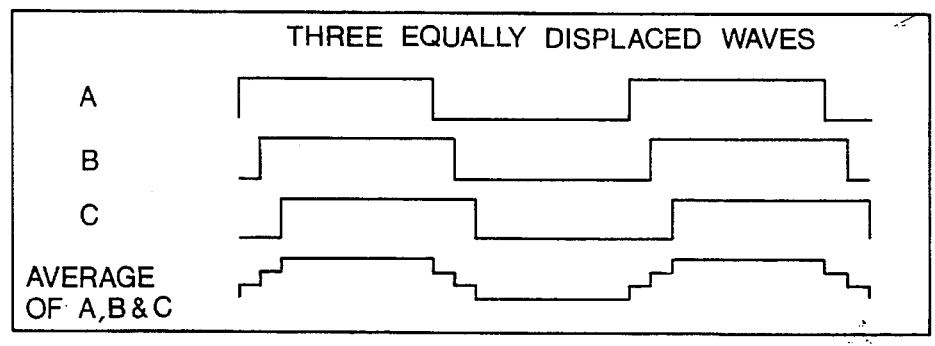
FIG. 2 are graphs of three equally displaced waves and their average.
Figure 3:
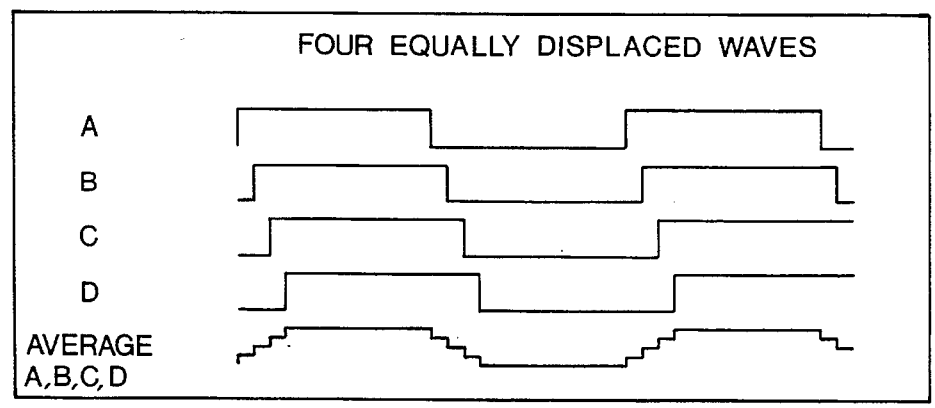
FIG. 3 are graphs of four equally displaced waves and their average.
Figure 4:
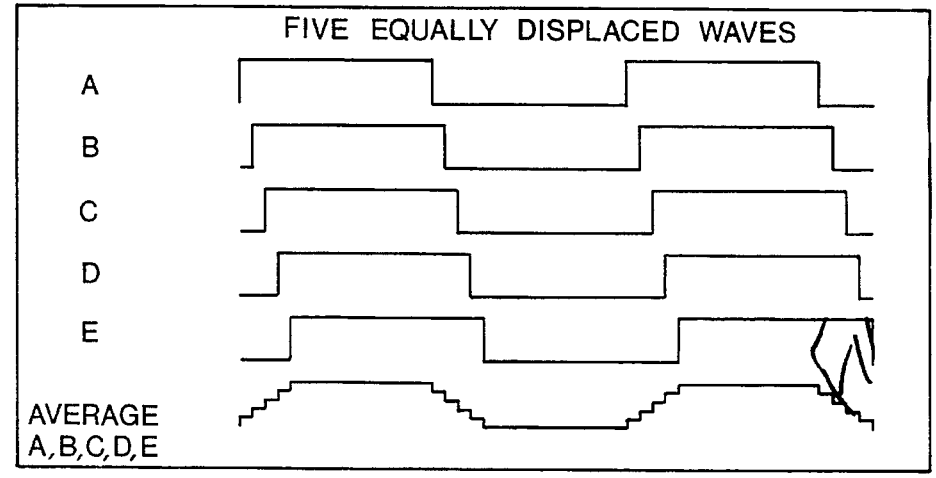
FIG. 4 are graphs of five equally displaced waves and their average.

FIGS. 1–4 illustrate the effect of combining sets of displaced square waveforms to produce an averaged output. In FIG. 1, the displaced square waves A and B are combined to produce the average of A and B waveform. FIG. 2 shows three equally displaced waveforms A, B and C, and the waveform of their average. FIG. 3 shows four equally displaced waveforms A, B, C and D, and the waveform of their average. FIG. 4 shows five equally displace waveforms A, B, C, D and E, and the waveform of their average. From comparing the average waveforms of FIGS. 1–4, it is apparent that FIG. 4 most closely approaches a sinusoid.

When two or more discretely displaced waves are combined, the amplitude of all harmonics present in the output is a function of the number of inputs and the angular displacement between adjacent inputs. The relative amplitude of a harmonic in the output divided by its amplitude at the input is referred to as harmonic attenuation. The harmonic attenuation is an independent waveform and holds true for any harmonics that exist at the input. When using this displacement technique in combination with basic 6-pulse or 12-pulse harmonic neutralizing configurations, only the residual harmonics need be attenuated.

FIGS. 5–10 illustrate the relative attenuation of selected harmonics which are typically characteristic of 6-pulse and 12-pulse systems. These graphs of relative attenuation are achieved by averaging two, three, four, five, six and seven evenly displaced waveforms plotted against displacement in FIGS. 5–10, respectively. In contrast, the graphs of FIGS. 1–4 show square waveforms which are displaced without specifying any angle of displacement. For each of these cases shown in FIGS. 5–10, individual harmonics cross zero at one or more angles of displacement. Furthermore, one or more adjacent pairs of harmonics are significantly attenuated at angles close to some of these zero crossings.

Figure 5:
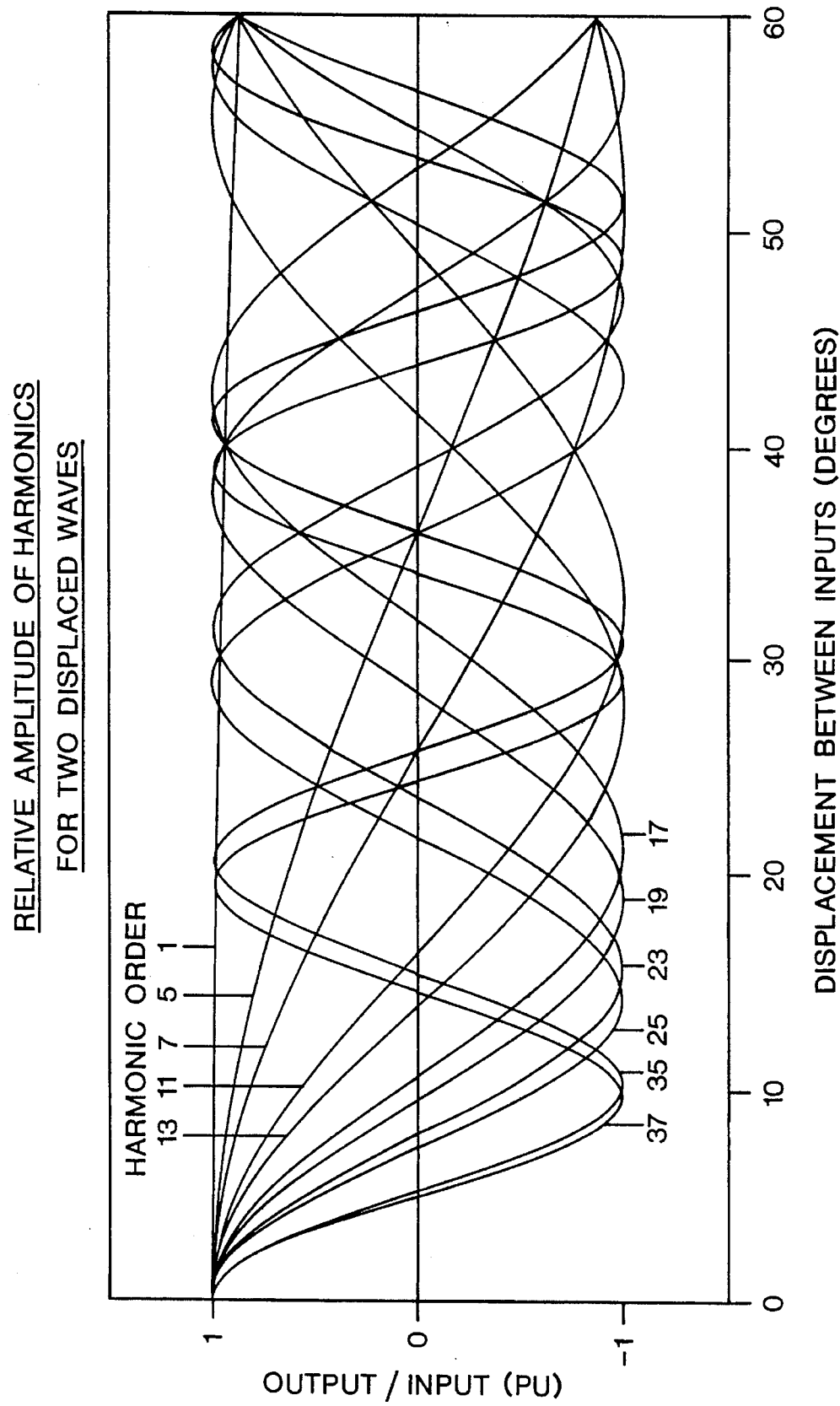
FIG. 5 are graphs of the harmonic attenuation of selected harmonics achieved by averaging two displaced waves plotted against the angular displacement of the waves.

For example, in FIG. 5, the adjacent 35th and 37th harmonic components are both close to zero around a displacement of 15°. By selecting the displacement of the two waves to be at the zero crossing of either the 35th or 37th harmonics, that harmonic is eliminated or totally neutralized, and the other harmonic is greatly reduced or quasi-neutralized. By selecting the displacement of the two waves to be at 15°, both the 35th and 37th harmonic components are greatly reduced, although not entirely eliminated, to a value on the order of 10% of the fundamental amplitude in this example.

Figure 6:
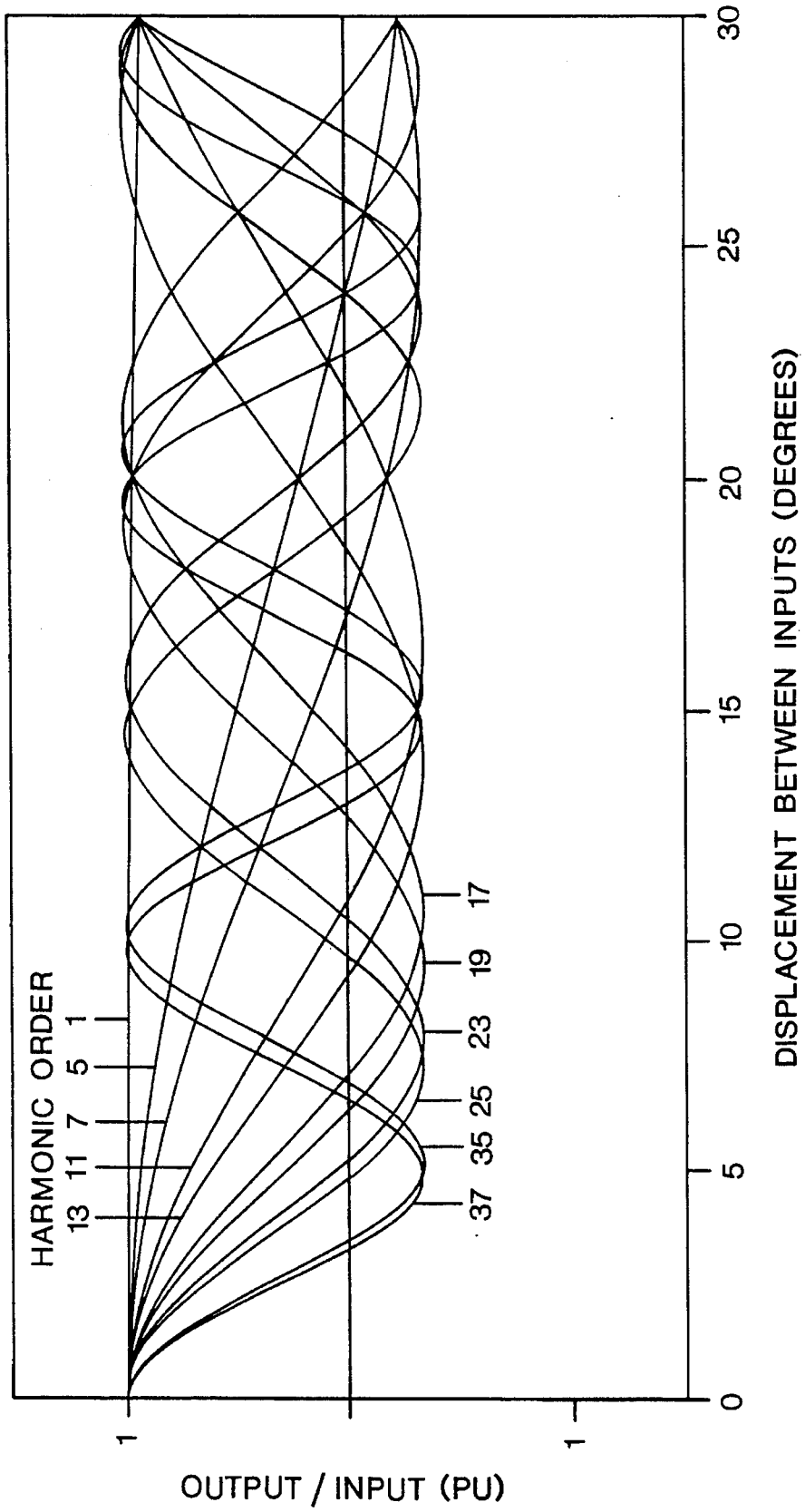
FIG. 6 are graphs of the harmonic attenuation of selected harmonics achieved by averaging three equally displaced waves plotted against the angular displacement of the waves.

Thus, selected harmonics may be greatly reduced, or quasi-neutralized, by choosing the appropriate displacement angle for the number of waveforms to be combined, that is, for two waveforms refer to FIG. 5, for three waveforms refer to FIG. 6, etc. By selection of this displacement angle, selected harmonics may be greatly reduced so the inverter system provides a voltage output having a quasi-harmonic neutralized waveform.

Basic 12-Pulse System

Figure 11:
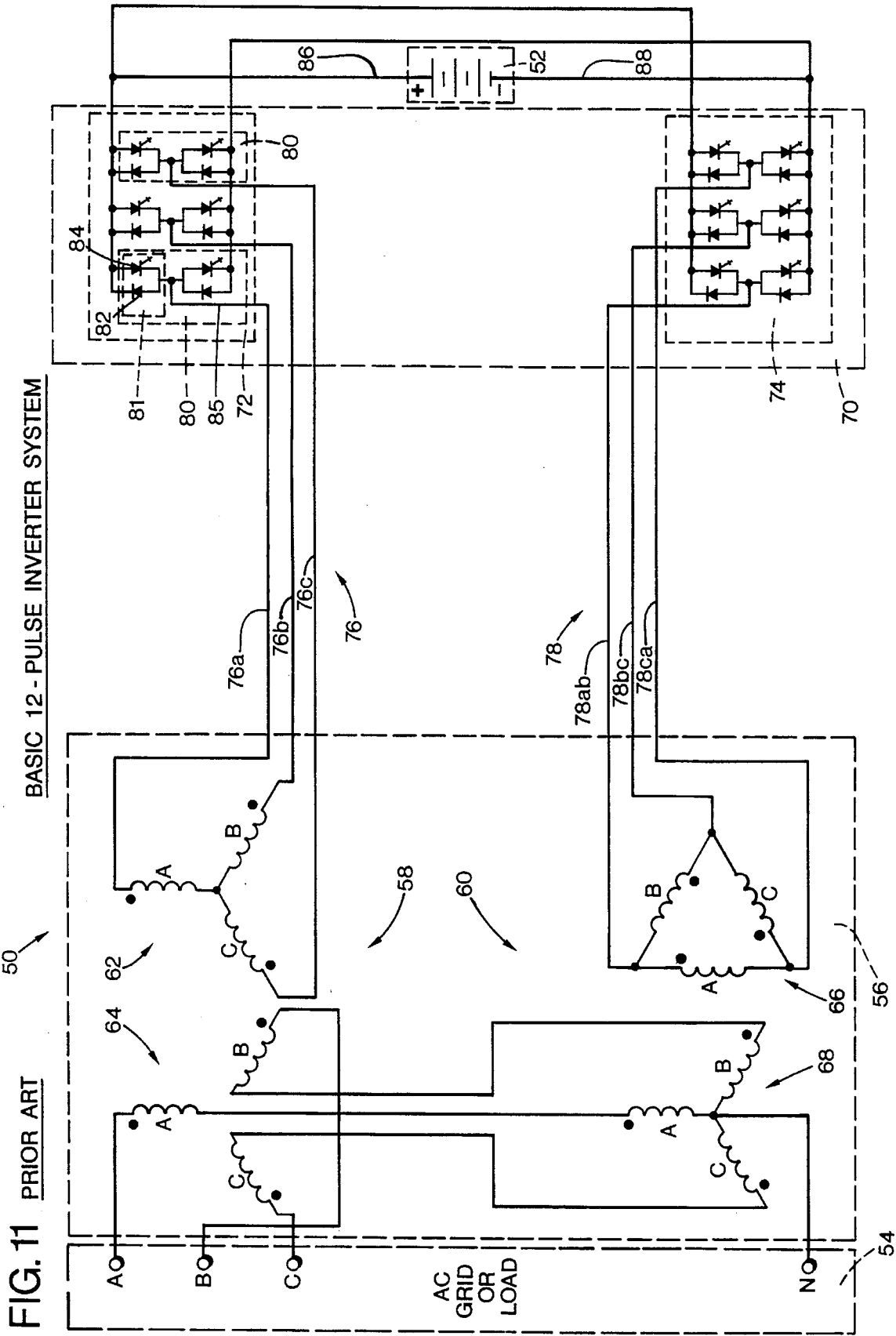
FIG. 11 is a schematic diagram of a prior art basic 12-pulse inverter system having a main transformer with separate wye/wye and delta/wye power transformers.

Now the theory and desired outputs have been described, several inverter systems capable of meeting these criteria will be illustrated and described. FIG. 11 illustrates a prior art inverter system containing some of the building blocks used in constructing the illustrated embodiments of the present invention shown in FIGS. 19, 22, 24, 27, 30, 34 and 35. FIGS. 12–35 illustrate various manners of combining displaced inputs according to the present invention with various combinations of basic 12-pulse building block inverter configurations, as well as the results of these combinations.

FIG. 11 illustrates a prior art basic 12-pulse high power voltage sourced inverter system 50 for inverting direct current (DC) power from an input DC power source 52 into an alternating current (AC) power output for supply to an AC power transmission or distribution system, such as an AC grid 54. Alternatively, the AC output power may be supplied to an AC load, such as an airborne power system, an industrial drive unit or the like. For convenience, "grid 54" is used herein to denote both AC power systems and AC loads, unless specifically noted otherwise. The DC source 52 may be a battery bank, a capacitor bank or other DC power storage device.

The prior art inverter system 50 has a three phase conventional main transformer 56. The main transformer 56 has two separate power transformers, one a wye/wye power transformer 58, and the other a delta/wye power transformer 60. The wye/wye transformer 58 has wye connected primary windings 62, and wye connected secondary windings 64 (using an inverter engineer's terminology as mentioned above). The delta/wye transformer 60 has delta connected primary windings 66 and wye connected secondary windings 68. The secondary windings 64 and 68 of respective transformers 58 and 60 are in series as shown in FIG. 11. The series connected secondary windings 64 and 68 terminate in conventional A, B, C and N terminals which may be coupled to the AC grid 54 as shown in FIG. 11. Alternatively, as known to those skilled in the art, a tie reactance (not shown) may be used to link the main transformer 56 with the AC grid 54, although for some units the leakage impedance inherent in the main transformer 56 may be sufficient.

The prior art inverter system 50 has a two-section 12-pulse inverter 70 with first and second 6-pulse inverter stages or sections 72 and 74. The inverter section 72 is coupled to the primary windings 62 of the wye/wye transformer 58 by conductors 76, while inverter section 74 is coupled to the primary windings 66 of the delta/wye transformer 60 by conductors 78. The conductors 76 include three conductors 76a, 76b and 76c for the three phase system illustrated, while the conductors 78 include three conductors 78ab, 78bc, and 78ca.

Each inverter section 72, 74 comprises three inverter poles, such as pole 80, with each pole 80 having two arms, such as arm 81. Each arm 81 has a diode, such as a free-wheeling diode 82, in anti-parallel with a switching device, such as a gate turn-off thyristor (GTO) 84. The firing signals for the GTOs 84 may be provided in a conventional manner (not shown) known to those skilled in the art. The junction of the GTO's 84 and diodes 82 forms an AC terminal or pole output, such as the pole output terminal 85 for inverter pole 80. The inverter poles 80 of inverter sections 72 and 74 couple the respective conductors 76 and 78 to the DC source 52 via positive and negative DC buses 86 and 88, respectively, as shown in FIG. 11. The conventional inverter 70 provides conventional three phase voltage waveforms to the main transformer 56. For example, the following conductors receive waveforms from inverter 70 at the following phase shifts:

| Conductor Item No. | Degrees |
|---|---|
| 76a | 0° |
| 76b | 240° |
| 76c | 120° |
| 78ab | 30° |
| 78bc | 270° |
| 78ca | 150° |

As is known in the art, the series connection of the primary windings 64 and 68 of the main transformer 56 cancel the basic 6-pulse harmonics, leaving only the 12-pulse harmonic components. Selected components of the remaining 12-pulse harmonics are quasi-neutralized using the QHNI systems of the present invention. For the basic 12-pulse inverter system 50, the residual harmonic orders are:

$Hhd\ n=12p\pm 1$ and the amplitudes are given by:

$A_n=1/H_n$ where p is any integer, and the numeral "12" represents the number of pulses for the illustrated 12-pulse system. Thus, the dominant harmonics for the 12-pulse inverter system 50, in descending order, are the 11th, 13th, 23rd, 25th, 35th and 37th harmonics.

Interphase Transformer Configurations

Figure 13:
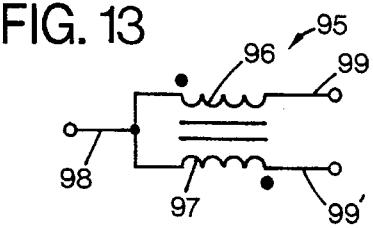

In accordance with the present invention, these dominant harmonics may be reduced by using inverters having a greater number of inverter sections to provide additional inverter outputs or poles, and by using interphase transformers (IPTs) in series with conductors 76 and 78 to couple the inverter poles with the main transformer 56. Several examples of suitable IPT configurations constructed in accordance with the present invention are shown in FIGS. 12–18. Where two or more inverter stages are combined or paralleled, IPTs are employed to ensure equalization of the input currents and averaging of the input voltages. Each IPT carries the current contributed by one inverter stage and supports the voltage difference between the inverter stage and the averaged output.

Where only two inverter pole inputs to the IPTs are present, a simple center-tapped IPT 90 shown in FIG. 12 may be used. The center-tapped IPT 90 has a single winding 91 with a center tap 92 for coupling IPT 90 with the main transformer 56. Conductors 93 and 94 couple winding 91 across two inverter poles 80. The center-tapped IPT 90 may also be represented as a standard two input IPT 95 having two identical windings 96 and 97, as shown in FIG. 13. A conductor 98 couples the IPT 95 to the main transformer 56, and conductors 99 and 99' couple the IPT 95 to the inverter.

Figure 14:
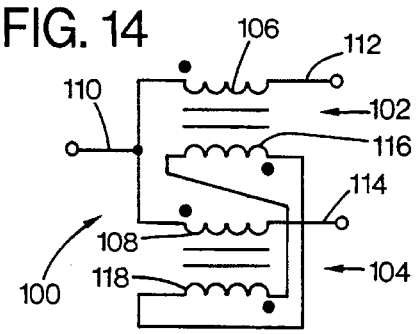

FIG. 14 illustrates a modular two input IPT 100 comprising two modular transformers 102 and 104 each have primary windings 106 and 108, respectively. The primary windings 106 and 108 are in parallel and coupled to the main transformer 56 by a conductor 110. Two conductors 112 and 114 couple the respective primary windings 106 and 108 to the inverter. The transformers 102 and 104 each have secondary windings 116 and 118 which are connected in series.

Figure 15:
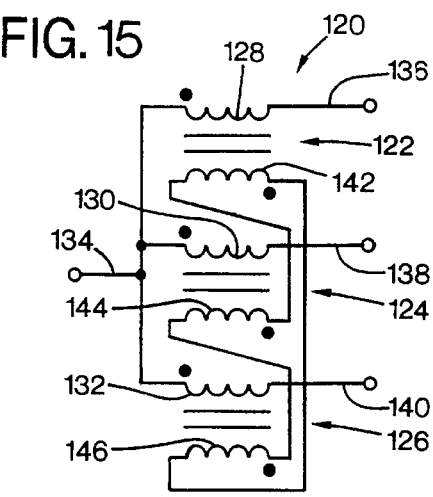

FIG. 15 illustrates a modular three input IPT 120 having three modular transformers 122, 124, and 126. The transformers 122–126 have respective primary windings 128, 130 and 132 which are coupled together in parallel and connected by a conductor 134 to the main transformer 56. The primary windings 128–132 are coupled to the inverter by the respective conductors 136, 138 and 140. The transformers 122–126 each have secondary windings 142, 144 and 146, respectively, which are in series.

Figure 16:
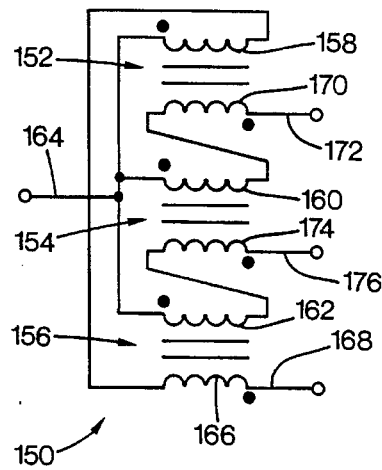

Referring to FIG. 16, a zig-zag three input IPT 150 has three modular transformers 152, 154 and 156. In the zig-zag configuration, the primary of one transformer is connected in series with the secondary of another of the transformers. The transformers 152–156 each have primary windings 158, 160 and 162, respectively, which are coupled together and connected to the main transformer 56 by a conductor 164. The primary winding 158 of transformer 152 is in series with a secondary winding 166 of transformer 156, and winding 166 is coupled to the inverter by a conductor 168. The primary winding 160 of transformer 154 is in series with a secondary winding 170 of transformer 152, and winding 170 is coupled to the inverter by a conductor 172. The primary winding 162 of transformer 156 is in series with a secondary winding 174 of transformer 154, and winding 174 is coupled to the inverter by a conductor 176.

Figure 17:
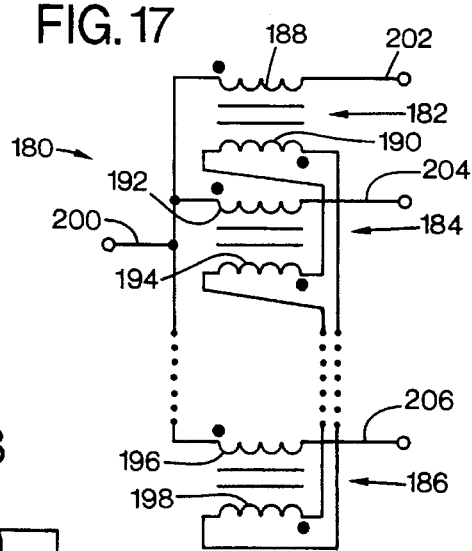

Referring to FIG. 17, the modular concept of FIG. 15 has been expanded into a multi-section modular IPT 180 which has a first modular transformer 182, a second modular transformer 184, and so forth, up to a final Nth modular transformer 186. The first modular transformer 182 has primary and secondary windings 188 and 190; the second modular transformer 184 has primary and secondary windings 192 and 194; and the final Nth modular transformer 186 has primary and secondary windings 196 and 198. Each of the primary windings 188, 192 and 196 are in parallel with one another and coupled by a conductor 200 to the main transformer 56. The primary windings 188, 192 and 196 are coupled to the inverter by conductors 202, 204 and 206, respectively. The secondary windings 190, 192 and 198 are connected in series.

Figure 18:
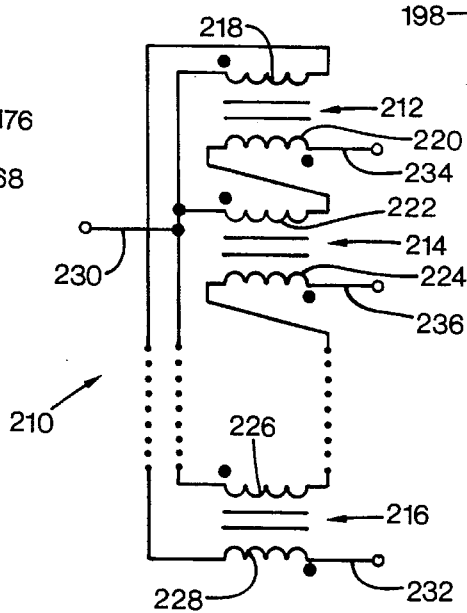

Referring to FIG. 18, the modular zig-zag concept of FIG. 16 has been expanded into a multi-section modular zig-zag IPT 210 which has a first modular transformer 212, a second modular transformer 214, and so forth, up to a final Nth modular transformer 216. The first modular transformer 212 has primary and secondary windings 218 and 220; the second modular transformer 214 has primary and secondary windings 222 and 224; and the final Nth modular transformer 216 has primary and secondary windings 226 and 228. The primary windings 218, 222 and 226 are coupled together and connected to the main transformer 56 by a conductor 230. The primary winding 218 of transformer 212 is in series with the secondary winding 228 of the final Nth transformer 216, and winding 228 is coupled to the inverter by a conductor 232. The primary winding 222 of transformer 214 is in series with the secondary winding 220 of transformer 212, and winding 220 is coupled to the inverter by a conductor 234. The primary winding 226 of the final transformer 216 is in series with a secondary winding of the N-1 transformer (not shown). The secondary winding 224 of the second transformer is in series with a primary of the third transformer (not shown), and winding 224 is coupled to the inverter by a conductor 236.

Center-tapped IPTs 90 or 95 are particularly useful for combining pairs of inputs, but if only center-tapped IPTs are used, they are limited to combinations of even numbers of inputs. In some applications the center-tapped IPT 90 or 95 may be preferred over a modular approach because the volt-ampere (VA) rating of the center-tapped IPT 90 or 95 is half that of the modular IPT 100. However the modular approach may be preferred for its flexibility, for example, use of the two, three and other multiple input modular IPTs 100, 120 and 180 may facilitate system design standardization because an identical modular transformer may be coupled to every inverter pole.

Thus, when three or more inverter poles are to be combined, center-tapped, standard, modular or zig-zag IPTs as shown in FIGS. 12–18, or combinations thereof, may be used. Both modular and zig-zag IPTs may actually be considered as modular, since either type of IPT can be provided as separate two winding transformers for each input. For three input IPTs, a wye and delta winding or zig-zag windings on a single three phase core may also be used. Several inverter system embodiments will now be described using the IPTs of FIGS. 12–18 in combination with various multi-section inverters having varying numbers of inverter sections.

24-Pulse QHNI System

Figure 19:
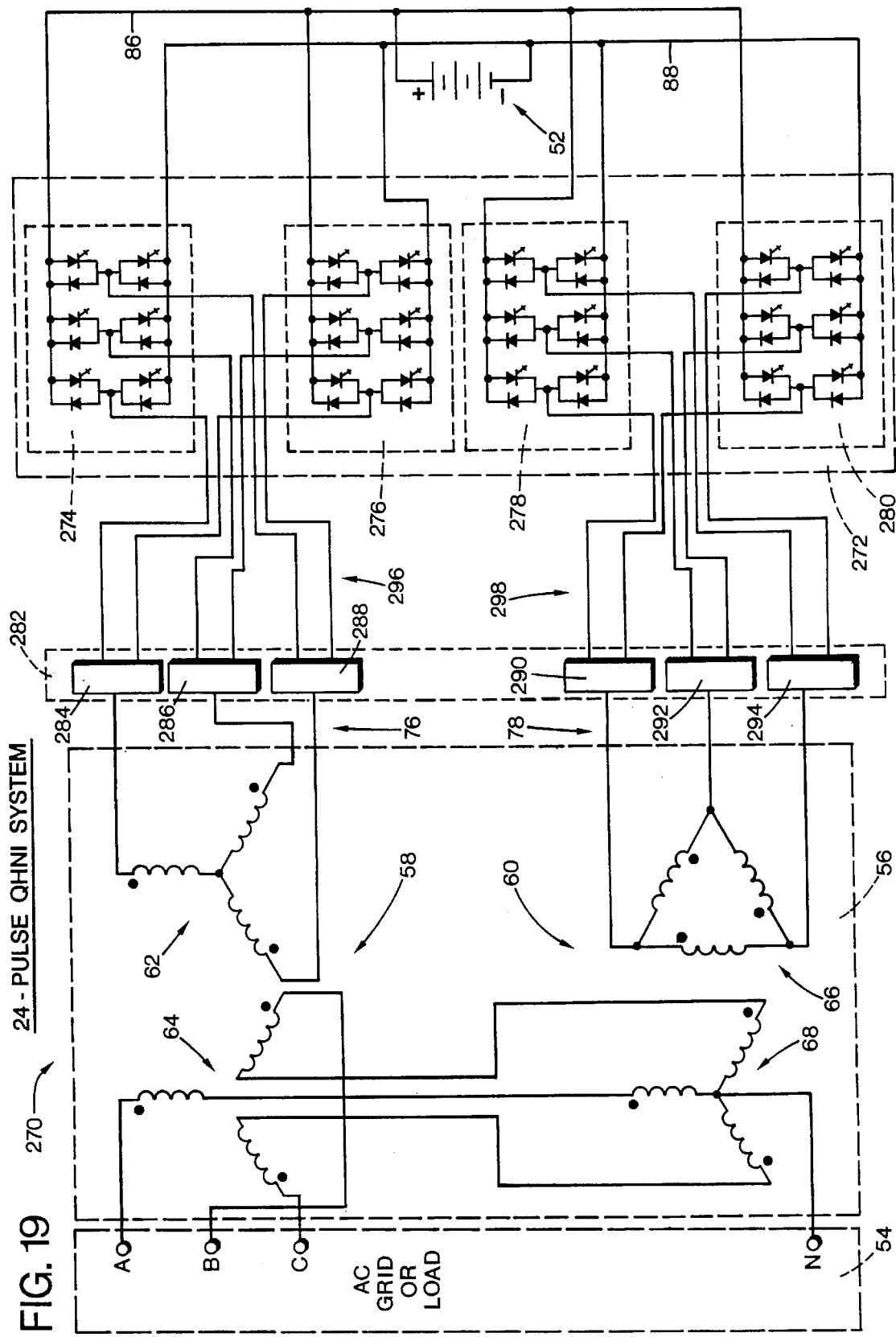
FIG. 19 is a schematic block diagram of one form of a 24-pulse quasi-harmonic neutralized inverter (QHNI) system of the present invention.

Referring to FIG. 19, a 24-pulse quasi-harmonic neutralized inverter (QHNI) system 270 constructed in accordance with the present invention has a main transformer 56 coupled to the AC grid 54 as described above for FIG. 11. However, it is apparent that the present invention may be used with any type of transformer. The 24-pulse QHNI system 270 includes a four section inverter 272 having four inverter sections or stages 274, 276, 278 and 280, which may each be 6-pulse inverter sections as described above for the inverter section 72 (see FIG. 11). Each of the inverter sections 274–280 are coupled to the DC source 52 by the positive and negative DC buses 86 and 88.

The 24-pulse QHNI system 270 has an IPT bank 282 comprising six IPTs 284, 286, 288, 290, 292 and 294, coupling the inverter 272 to the main transformer 56. The conductors 76 couple IPTs 284–288 to the main transformer primary wye winding 62, and conductors 78 couple IPTs 290–294 to the main transformer primary delta windings 66. The IPTs 284–288 are coupled to the inverter sections 274 and 276 by conductors 296 as shown in FIG. 19. Similarly, the IPTs 290–294 are coupled by conductors 298 to the inverter sections 278 and 280 as shown. The IPTs 284–294 may each be a center-tapped IPT as shown in FIGS. 12 or 13, or a modular two input IPT 100 as shown in FIG. 14.

Figure 20:
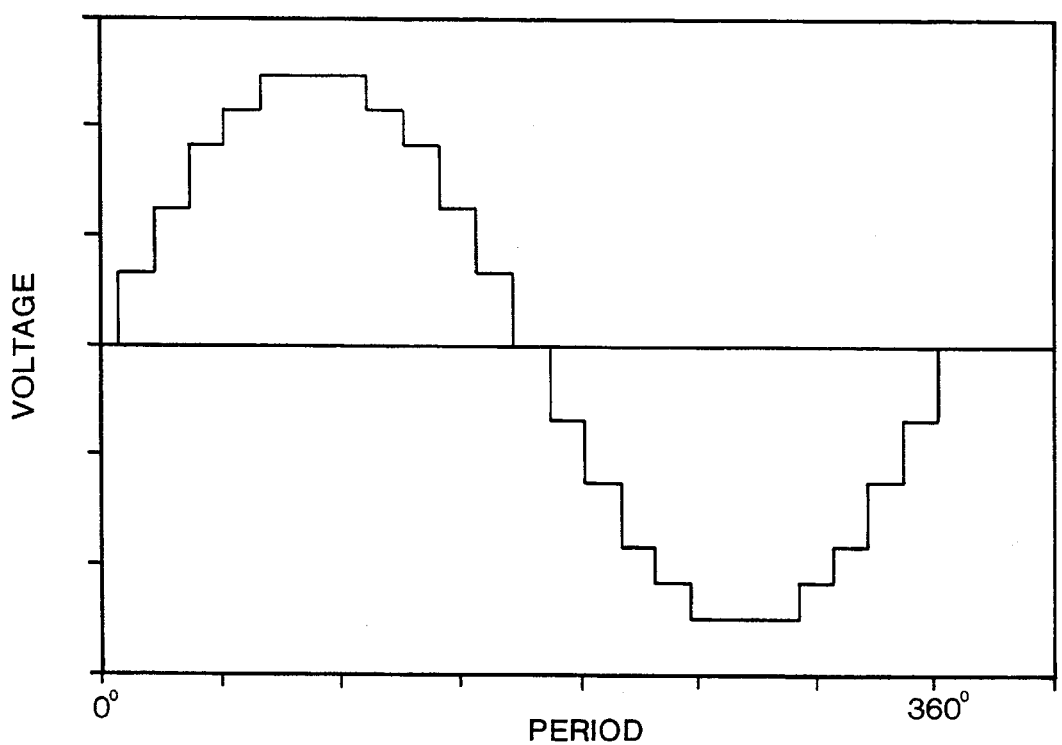
FIG. 20 is a graph of the resulting 24-pulse output voltage waveform of the 24-pulse QHNI system of FIG. 19.

The resulting 24-pulse line to neutral output voltage waveform which appears at each of the A, B, C and N terminals of the main transformer 56 is shown in FIG. 20. The graphs of the line to neutral output voltage waveforms shown in FIGS. 20, 25, 28 and 32 are the open circuit waveforms excluding the leakage reactance of the main transformer 56. These waveforms represent the unloaded output of the applicable inverter system after all of the waveform combinations have taken place in both the interphase transformers and the main transformer.

Figure 21:
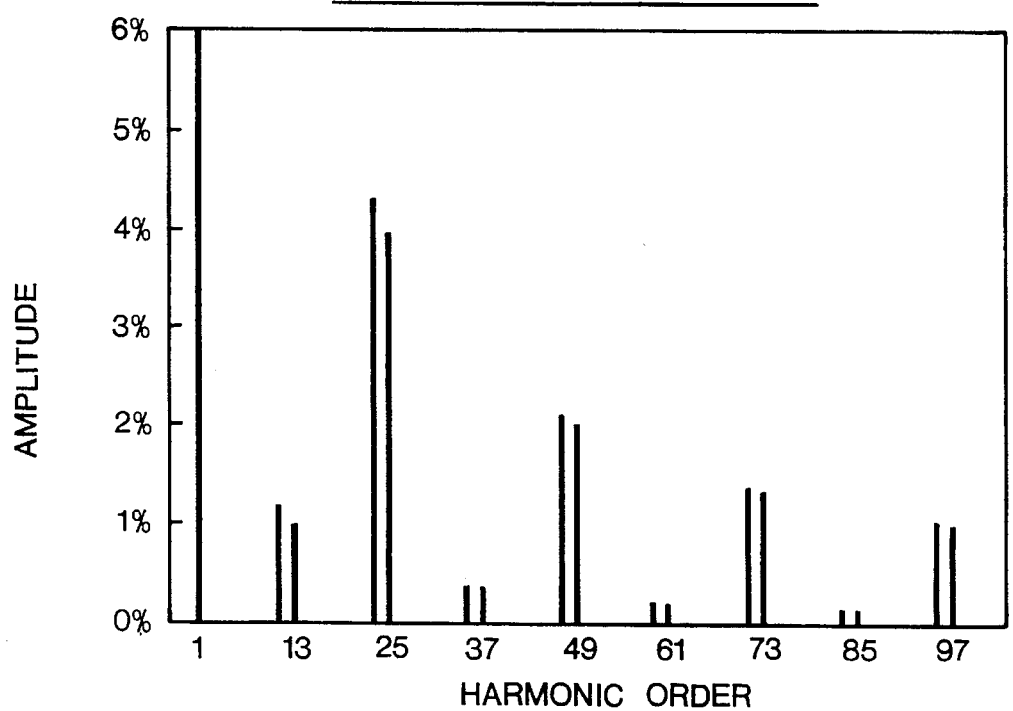
FIG. 21 is a graph of the harmonic spectrum of the output voltage of the 24-pulse QHNI system of FIG. 19.

Referring to FIG. 21, the harmonic spectrum of the 24-pulse QHNI output voltage of system 270 is shown. Using the 24-pulse QHNI system 270, the 11th and 13th harmonics are greatly reduced from the harmonics experienced using the prior art basic 12-pulse inverter system 50 of FIG. 11. The four section inverter 272 provides two 15° displaced sets of 12-pulse inputs to the main transformer 56 using the IPT bank 282. Two such displaced waves are shown in FIG. 1. The effect on the harmonics of the two 15° displaced sets of 12-pulse waveforms may be seen at the 15° value in FIG. 5.

36-Pulse QHNI System

Figure 22:
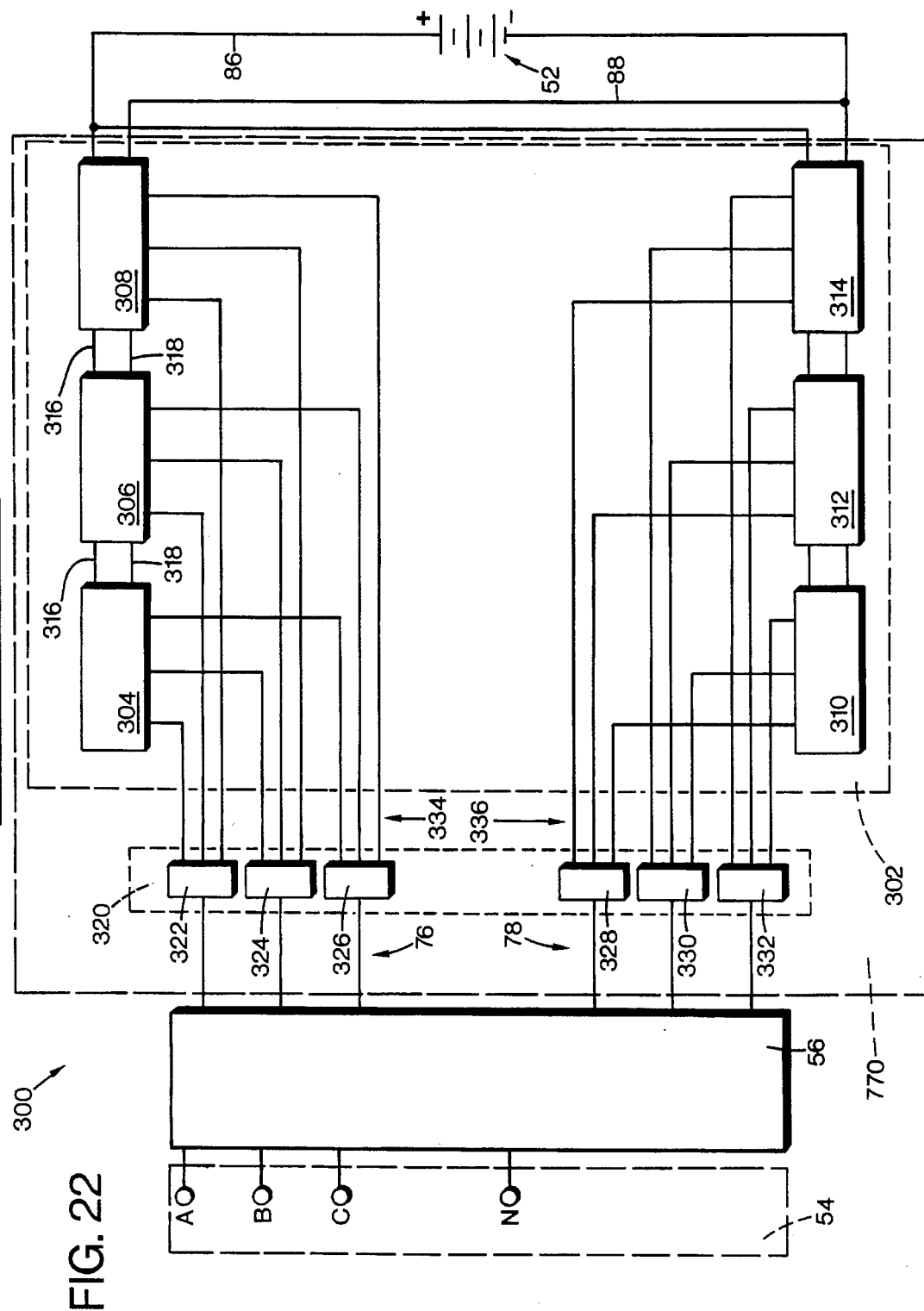
FIG. 22 is a schematic block diagram of one form of a 36-pulse QHNI system of the present invention.

Referring to FIG. 22, a 36-pulse quasi-harmonic neutralized inverter (QHNI) system 300 constructed in accordance with the present invention includes a main transformer 56 coupled to the AC grid 54 as shown. The 36-pulse QHNI system 300 has a six section inverter 302 including six inverter sections 304, 306, 308, 310, 312 and 314. The inverter sections 304–314 may be as described above for inverter section 72. Each of the inverter sections 304–314 is coupled to the DC source 52 by connections to the positive and negative DC buses 86 and 88. For example, the inverter sections 304 and 306 are coupled by conductors 316 and 318 to the respective positive and negative DC buses 86 and 88.

An IPT bank 320 couples the six section inverter 302 to the main transformer 56. The IPT bank 320 includes six IPTs 322, 324, 326, 328, 330 and 332. The IPTs 322–332 may be either the modular three input IPT 120 as shown in FIG. 15, or a zig-zag three input IPT 150 as shown in FIG. 16. Conductors 76 couple the IPTs 322–326 with the main transformer 56, and conductors 78 couple the IPTs 328–332 with the main transformer. Conductors 334 couple the IPTs 322–326 to the inverter sections 304–308, and conductors 336 couple the IPTs 328–332 with the inverter sections 310–314, as shown in FIG. 22.

The 36-pulse QHNI system 300 greatly reduces the 11th, 13th, 23rd and 25th harmonics over that possible with the prior art basic 12-pulse inverter system 50. The IPT bank 320 combines three sets of 12-pulse inputs displaced by 10° as shown for waveforms A, B and C in FIG. 2. The effect of the 10° displacement of the three waveforms received by the IPTs 322—332 is evident from an examination of the relative amplitude of the harmonics at 10° in FIG. 6. The resulting 36-pulse output voltage harmonic spectrum is shown in FIG. 23. Comparing the 36-pulse QHNI spectrum of FIG. 23 with the 24-pulse QHNI spectrum of FIG. 21, it is clear that the 25th and 27th harmonics have been significantly reduced using the 36-pulse QHNI system 300. The 35th and 37th harmonics remain as having the greatest amplitude using the 36-pulse QHNI system 300.

48-Pulse QHNI System

Figure 24:
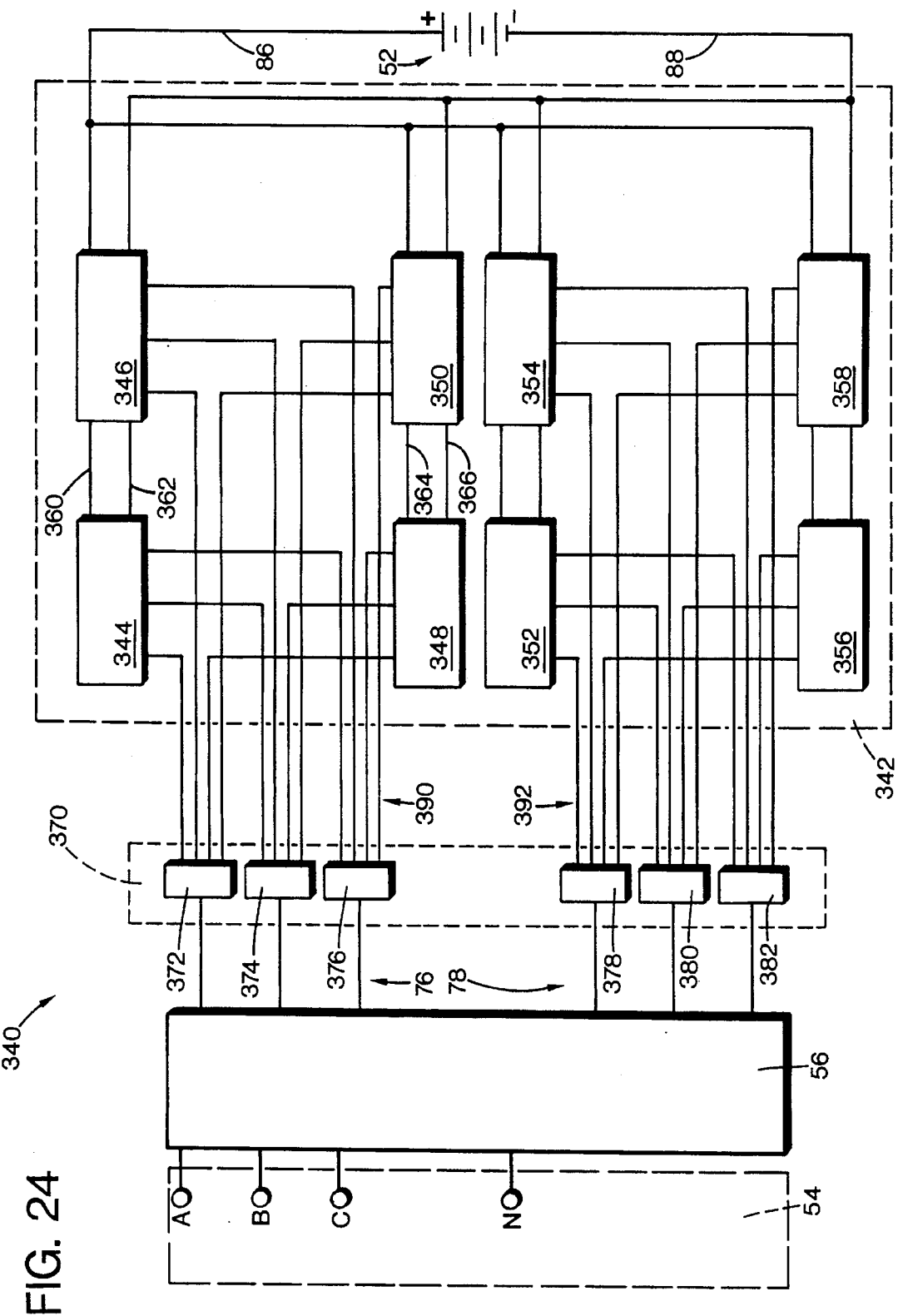
FIG. 24 is a schematic block diagram of one form of a 48-pulse QHNI system of the present invention.
Figure 25:
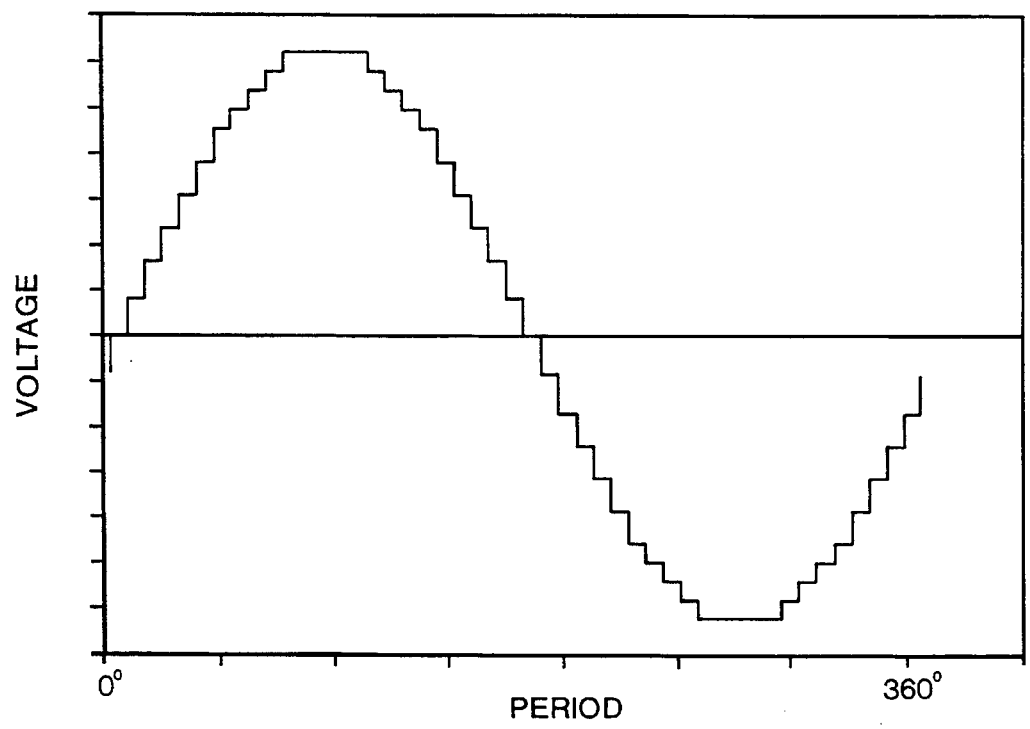
FIG. 25 is a graph of the resulting 48-pulse output voltage waveform of the 48-pulse QHNI system of FIG. 24.

Referring to FIG. 24, a 48-pulse quasi-harmonic neutralized inverter (QHNI) system 340 constructed in accordance with the present invention includes a main transformer 56 coupled to the AC grid 54. The 48-pulse QHNI system 340 also includes an eight section inverter 342 having eight inverter sections 344, 346, 348, 350, 352, 354, 356 and 358. The inverter sections 344–358 may be as described above for inverter section 72. Each of the inverter sections 344–358 is coupled to the DC source 52 by the positive and negative DC buses 86 and 88. For example, inverter section 344 is coupled to the positive and negative DC buses 86, 88 by conductors 360 and 362, respectively, and inverter section 348 is coupled by conductors 364 and 366 to the respective DC buses 86 and 88.

The 48-pulse QHNI system 340 has an IPT bank 370 coupling the main transformer 56 with the inverter 342. The illustrated IPT bank 370 has six IPTs 372, 374, 376, 378, 380 and 382. The IPTs 372–382 may each be a four input modular IPT 180 as shown in FIG. 17, or a four input zig-zag IPT 210 as shown in FIG. 18, with either configuration having the Nth stage equal to four. The main transformer 56 is coupled by conductors 76 to IPTs 372–376, and by conductors 78 to IPTs 378–382. Conductors 390 couple the IPTs 372–376 to the inverter sections 344–350, whereas conductors 392 couple the IPTs 378–382 to the inverter sections 352–358, as shown in FIG. 24.

Figure 7:
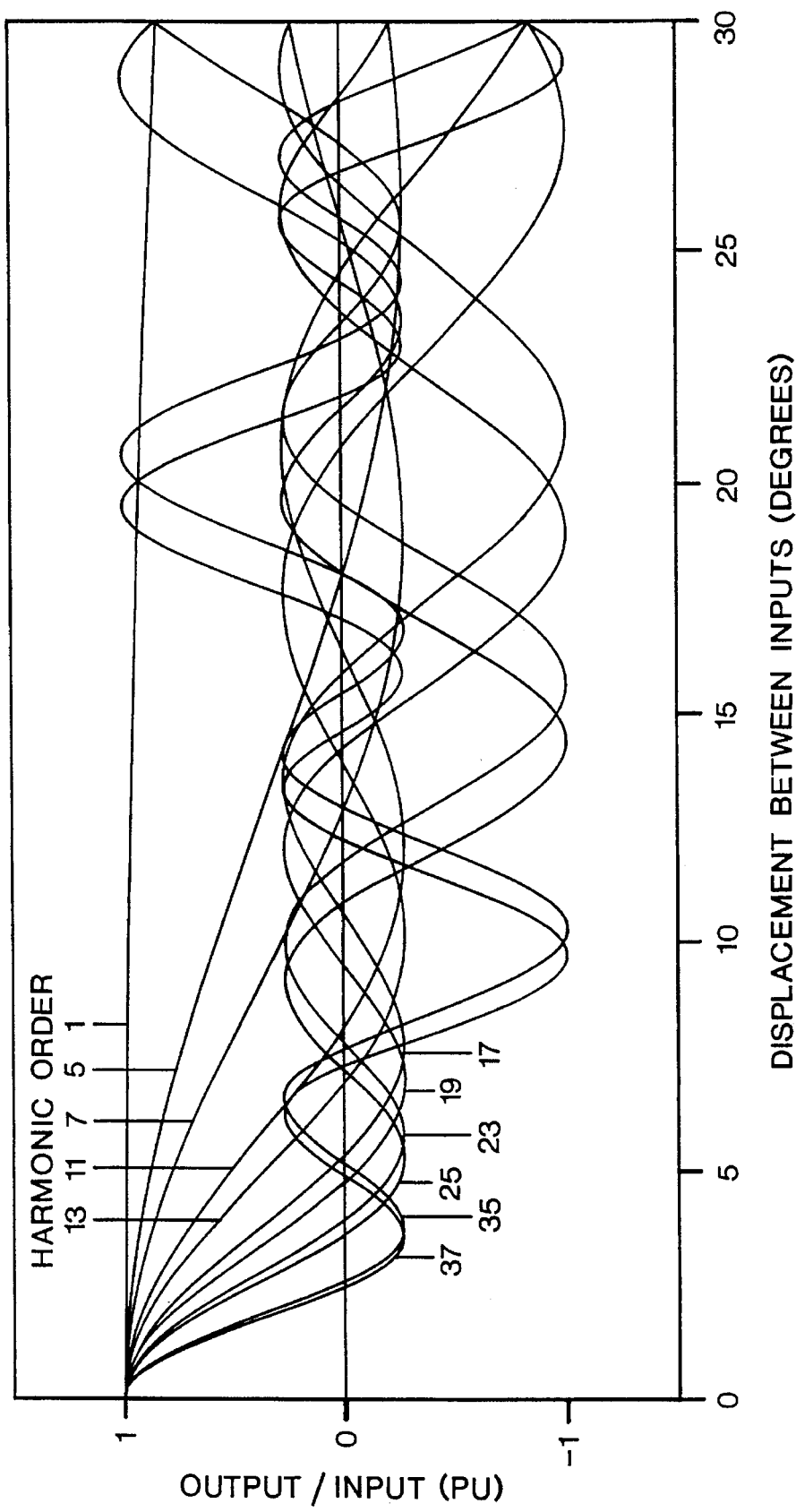
FIG. 7 are graphs of the harmonic attenuation of selected harmonics achieved by averaging four equally displaced waves plotted against the angular displacement of the waves.
Figure 8:
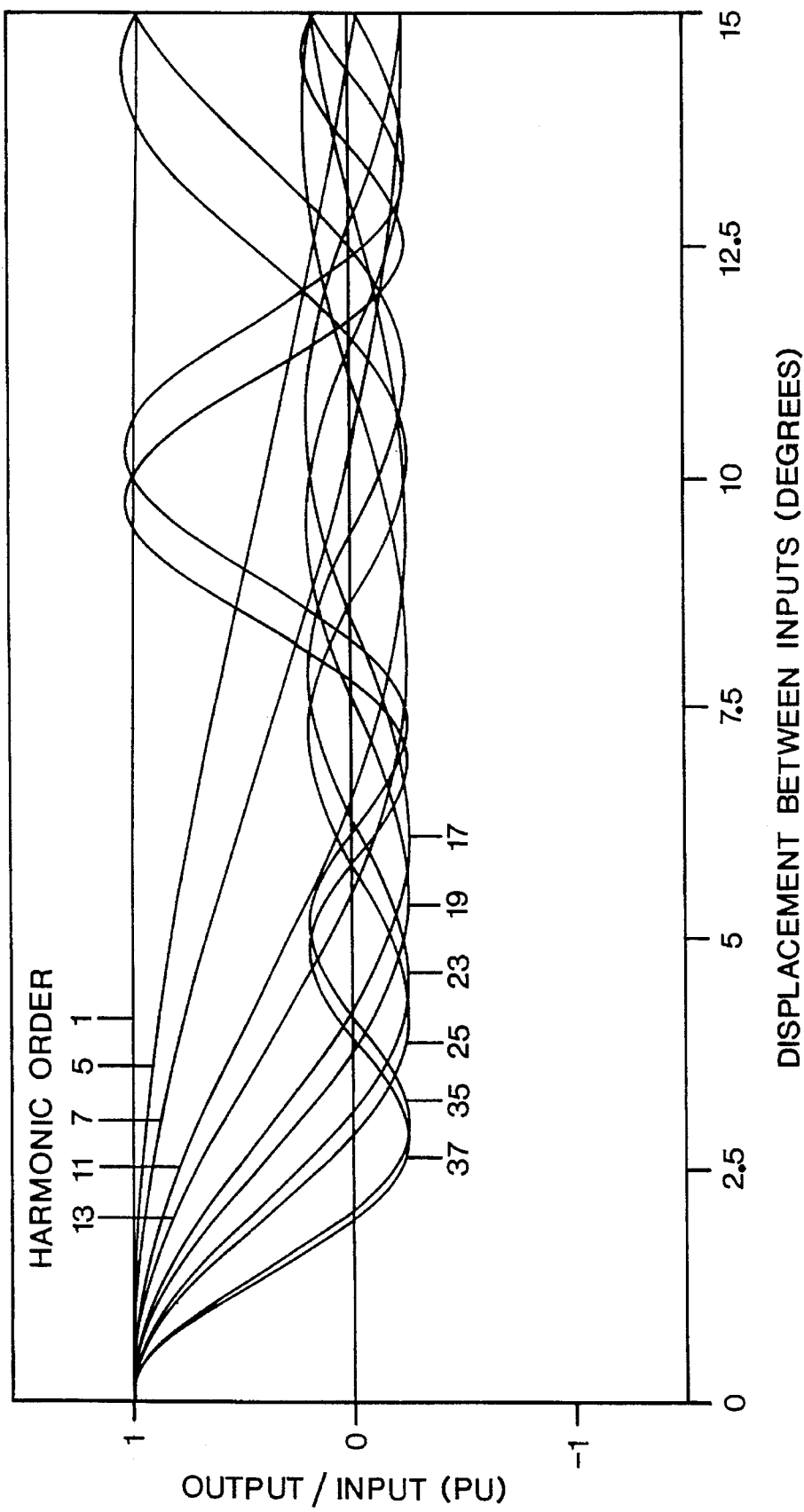
FIG. 8 are graphs of the harmonic attenuation of selected harmonics achieved by averaging five equally displaced waves plotted against the angular displacement of the waves.
Figure 9:
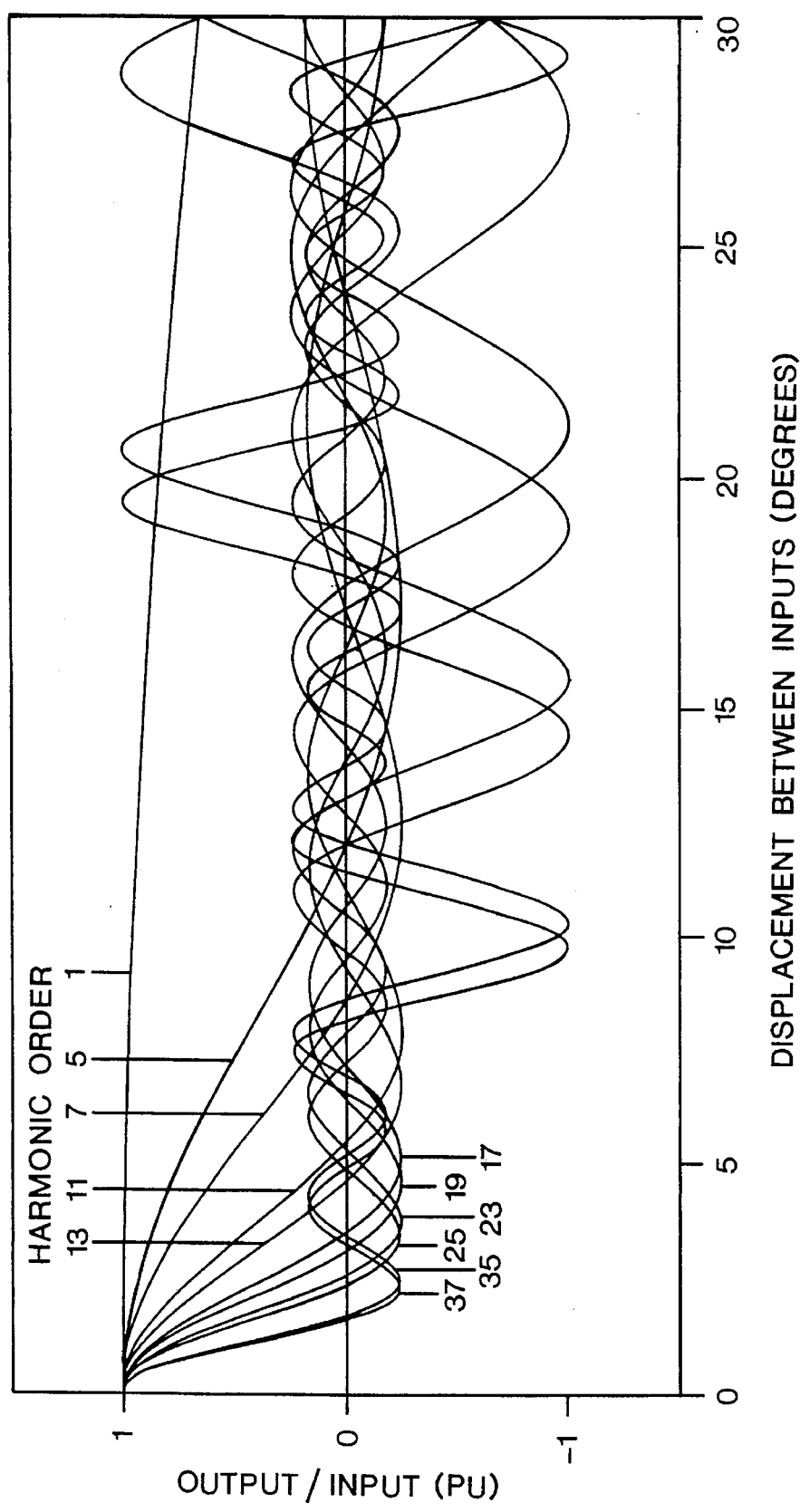
FIG. 9 are graphs of the harmonic attenuation of selected harmonics achieved by averaging six equally displaced waves plotted against the angular displacement of the waves.
Figure 10:
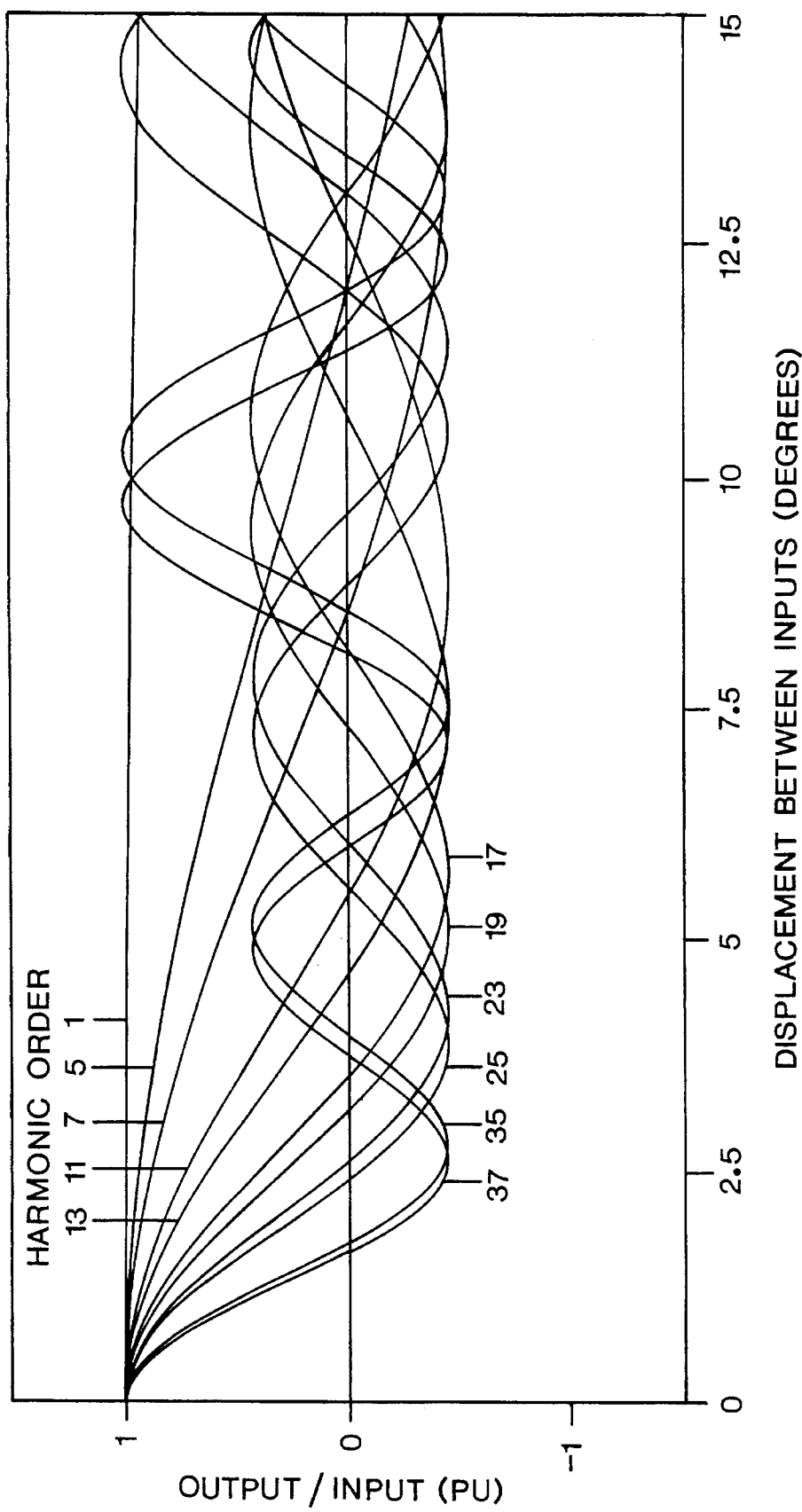
FIG. 10 are graphs of the harmonic attenuation of selected harmonics achieved by averaging seven equally displaced waves plotted against the angular displacement of the waves.
Figure 26:
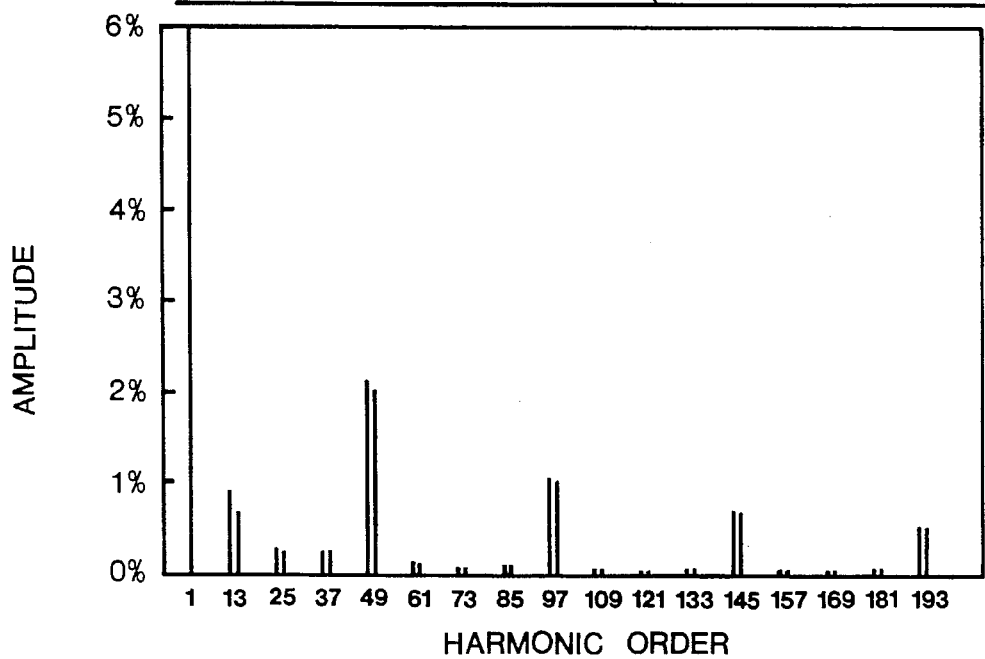
FIG. 26 is a graph of the harmonic spectrum of the output voltage of the 48-pulse QHNI system of FIG. 24.

The eight section inverter 342 provides four sets of evenly displaced 12-pulse inputs as shown in FIG. 3 to the IPT bank 370. The IPT bank 370 combines these inputs to provide the 48-pulse QHNI line to neutral output voltage waveform of FIG. 25 to the AC grid 54. These waveform inputs are displaced from one another by 7.5°. The resulting harmonic spectrum of the 48-pulse QHNI voltage is shown in FIG. 26 for equally displaced inputs from the inverter 342. The relative amplitude of the harmonics for the four equally displaced waves is shown in FIG. 7 at 7.5°. Comparing the harmonic spectrum of FIG. 26 with that of FIG. 23, it is apparent that the 48-pulse QHNI system 340 has significantly reduced the 35th and 37th harmonics, leaving the 47th and 49th harmonics as having the greatest amplitude in the harmonic spectrum.

72-Pulse QHNI System

Figure 27:
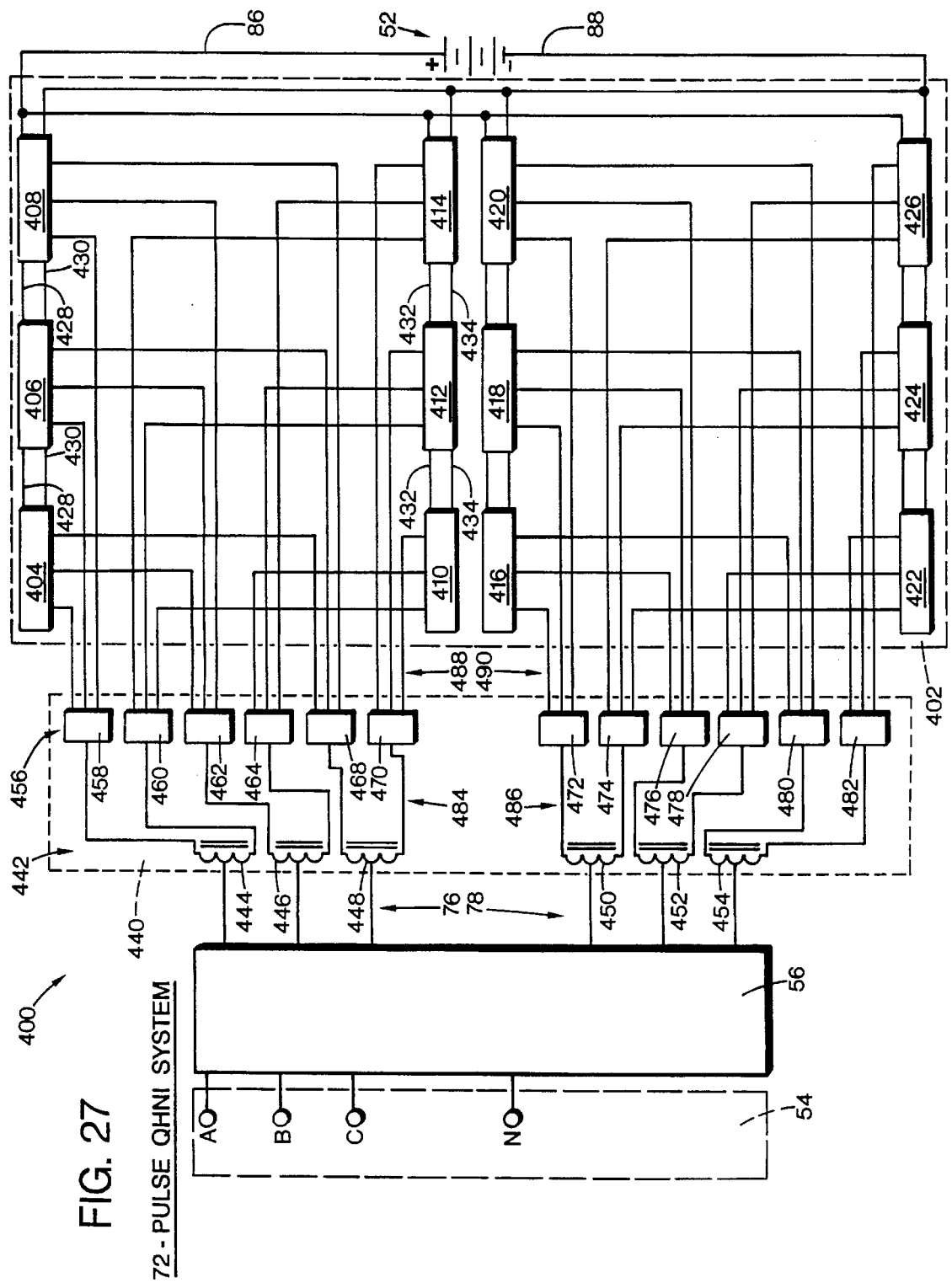
FIG. 27 is a schematic block diagram of one form of a 72-pulse QHNI system of the present invention.

Referring to FIG. 27, a 72-pulse quasi-harmonic neutralized inverter (QHNI) system 400 constructed in accordance with the present invention includes a main transformer 56 coupled to the AC grid 54. The 72-pulse QHNI system 400 includes a 12-section inverter 402 having twelve sections 404, 406, 408, 410, 412, 414, 416, 418, 420, 422, 424 and 426. Each of the inverter sections 404–426 may be as described above for inverter section 72. Each of the inverter sections 404–426 are coupled to the DC power source 52 by the positive and negative DC buses 86 and 88. For example, the positive and negative DC buses 86 and 88 are coupled to inverter sections 404 and 406 by the respective conductors 428 and 430, and to the inverter sections 410 and 412 by conductors 432 and 434, respectively.

The 72-pulse QHNI system 400 also has a two-stage IPT bank 440 coupling the inverter 402 to the main transformer 56. The IPT bank 440 has one stage or set of interphase transformers 442 comprising six IPTs 444, 446, 448, 450, 452 and 454. Each of the IPTs 444–454 are illustrated as center-tapped IPTs, such as the IPT shown in FIGS. 12 or 13. Alternatively, a modular two input IPT 100 as shown in FIG. 14 may be used. The IPT bank 440 also has another stage or set of IPTs 456 including twelve IPTs 458, 460, 462, 464, 468, 470, 472, 474, 476, 478, 480 and 482. The set of IPTs 458–482 may each be a modular three input IPT 120 as shown in FIG. 15, or a zig-zag three input IPT 150 as shown in FIG. 16.

Alternatively, the IPT bank 440 may be constructed as a single stage with six, six input multi-section modular IPTs (not shown). For example, the IPTs 444, 458 and 460 may be replaced with a single six input modular IPT 180 of FIG. 17, or a six input zig-zag IPT 210 of FIG. 18, with either configuration having the Nth stage equal to six.

In the illustrated embodiment, the main transformer 56 is coupled to the set of IPTs 444–448 by conductors 76, and to the set of IPTs 450–454 by conductors 78. The IPTs 444–448 are coupled to the IPTs 458–470 of the other stage by conductors 484, and the IPTs 450–454 are coupled to the IPTs 472–482 of the other stage by conductors 486. As shown in FIG. 27, the IPTs 458–470 are coupled to the inverter sections 404–414 by conductors 488, while the IPTs 472–482 are coupled to the inverter sections 416–426 by conductors 490.

Figure 28:
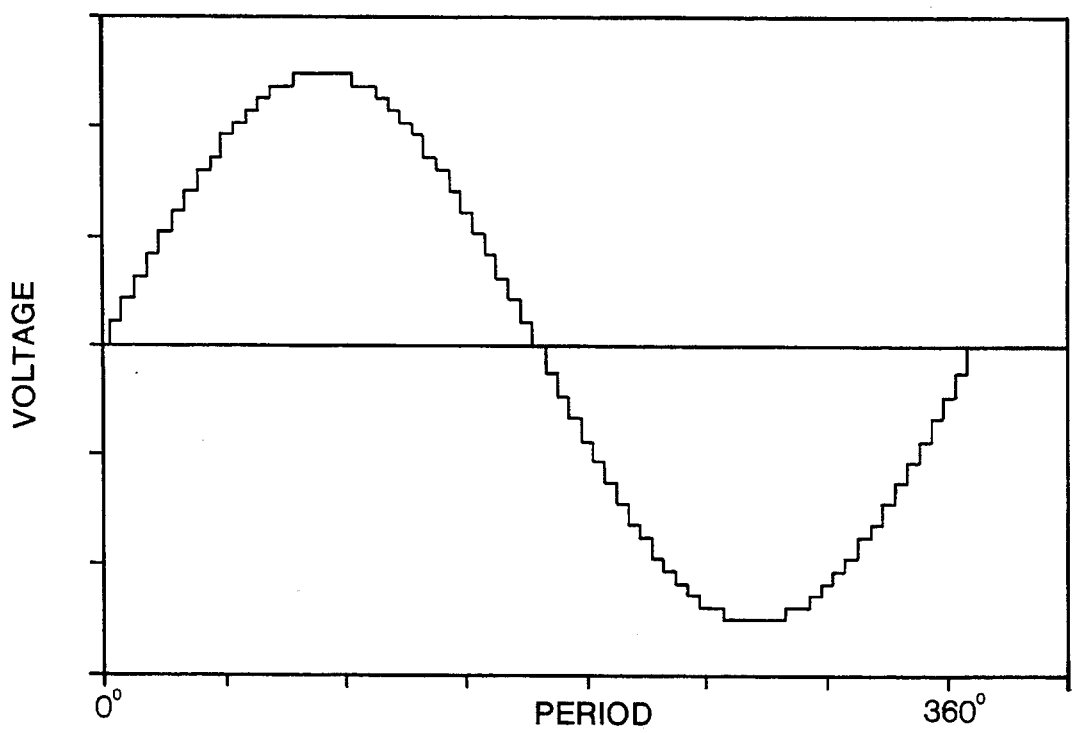
FIG. 28 is a graph of the resulting 72-pulse output voltage waveform of the 72-pulse QHNI system of FIG. 27.
Figure 29:
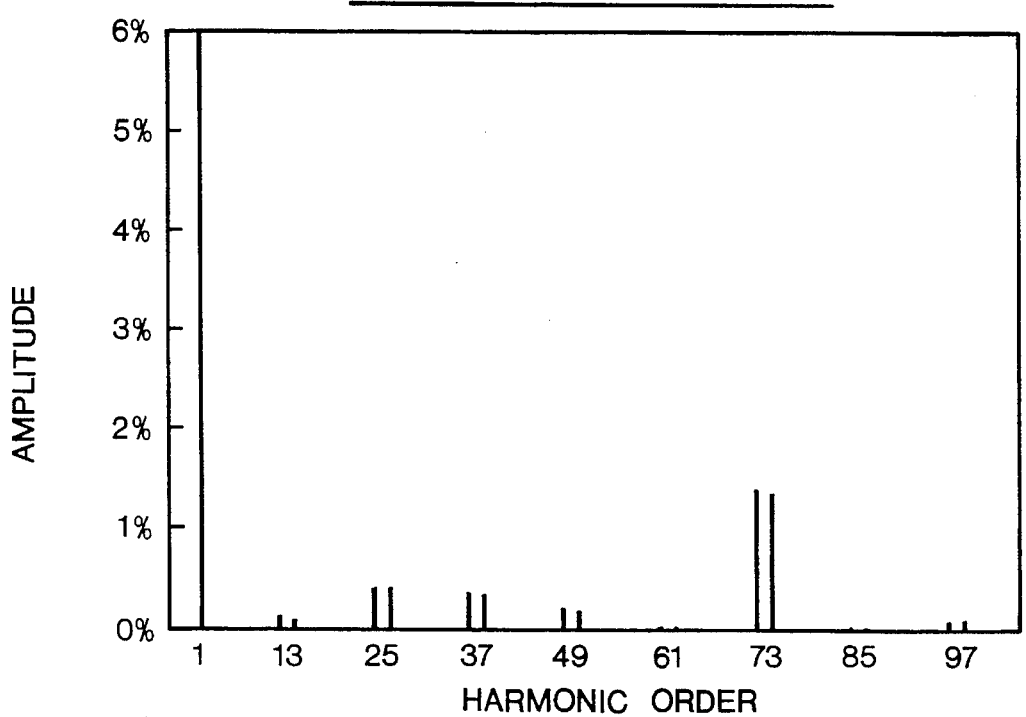
FIG. 29 is a graph of the harmonic spectrum of the output voltage of the 72-pulse QHNI system of FIG. 27.
Figure 32:
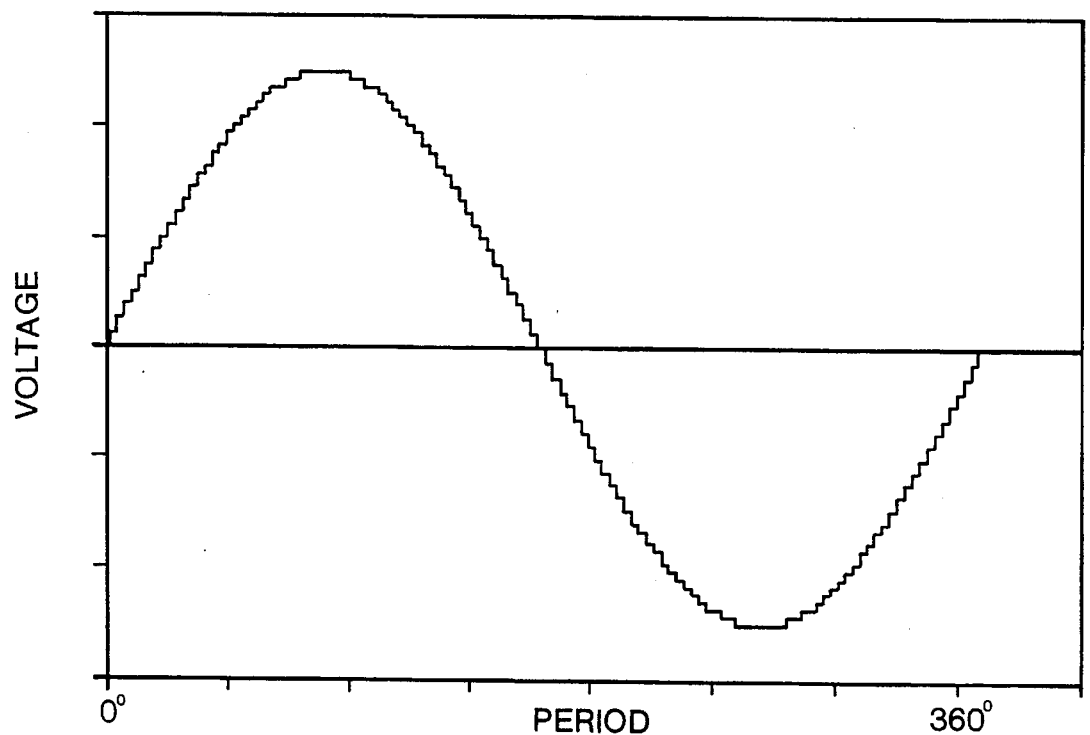
FIG. 32 is a graph of the resulting 120-pulse output voltage waveform of the 120-pulse QHNI system of FIG. 30.

Using the 72-pulse QHNI 400 operating in a basic 12-pulse configuration, all residual harmonics less than the 71st may be virtually eliminated by combining six sets of 12-pulse inputs from the inverter 402 to the IPT bank 440. The resulting 72-pulse QHNI line to neutral output voltage waveform supplied to the AC grid 54 is shown in FIG. 28. The sets of three input waveforms supplied by the inverter 402 to each IPT 458–482 of the IPT bank 440 are mutually displaced from one another by 10°. The waveforms supplied from the IPT stage 456 to the IPT stage 442 are mutually displaced from one another by 15°. Using this multi-tiered or hierarchial combination technique, the harmonic spectrum of FIG. 29 shows the virtual elimination of harmonics less than the 71st using the 72-pulse QHNI system 400.

120-Pulse QHNI System

Referring to FIG. 30, a 120-pulse quasi-harmonic neutralized inverter (QHNI) system 500 constructed in accordance with the present invention has a main transformer 56 coupled to an AC grid 54. The 120-pulse QHNI system 500 includes a twenty section inverter 502 having twenty 6-pulse inverter sections 504, 506, 508, 510, 512, 514, 516, 518, 520, 522, 524, 526, 528, 530, 532, 534, 536, 538, 540 and 542. It is apparent that the inverter 502 may also be constructed from ten 12-pulse inverter sections (not shown), where each 12-pulse inverter section comprises two 6-pulse inverter sections. Each of the inverter sections 504–542 are coupled to the DC source 52 via connections to the positive and negative DC buses 86 and 88. For example, the positive and negative DC buses 86 and 88 are coupled to inverter sections 504–512 by the respective conductors 544 and 545, and to inverter sections 514–522 by the conductors 546 and 548, respectively.

The 120-pulse QHNI 500 includes an IPT bank 550 coupling the inverter 502 with the main transformer 56. The IPT bank 550 includes six IPTs 552, 554, 556, 558, 560 and 562. As shown in FIG. 30, the IPTs 552–556 are coupled to the inverter sections 504–522 by conductors 564, and the IPTs 558–562 are coupled to the inverter sections 524–542 by conductors 566. Each of the IPTs 552–562 may be a hierarchial combination IPT such as the two-stage IPT 570 shown in FIG. 31.

The IPT 570 is a hierarchial arrangement including an IPT first stage 572 comprising two IPTs 574 and 576. The IPTs 574 and 576 may each be a modular five input IPT 180, as shown in FIG. 17, or the five input zig-zag IPT 210 of FIG. 18, with either configuration having the Nth stage equal to five. The conductors 578 couple the first stage IPTs 574 and 576 to the inverter 502. The IPT 570 also has a second stage IPT 580 coupled to the first stage IPTs 574 and 576 by conductors 582 and 584, respectively. A conductor 586 couples the second stage IPT 580 to the main transformer 56. The second stage IPT 580 may be a center-tapped IPT as shown in FIGS. 12 or 13, or a modular two input IPT 100 as shown in FIG. 14. It is apparent that other hierarchial combination IPTs (not shown) may also be used, including those having three or more stages using various combinations of IPTs shown in FIGS. 12–18.

Alternatively, the IPT bank 550 may be constructed as a single stage with six, ten input multi-section modular IPTs (not shown). For example, the IPTs 574, 576 and 580 of FIG. 31 may be replaced with a single ten input modular IPT 180 of FIG. 17, or a ten input zig-zag IPT 210 of FIG. 18, with either configuration having the Nth stage equal to ten.

Figure 33:
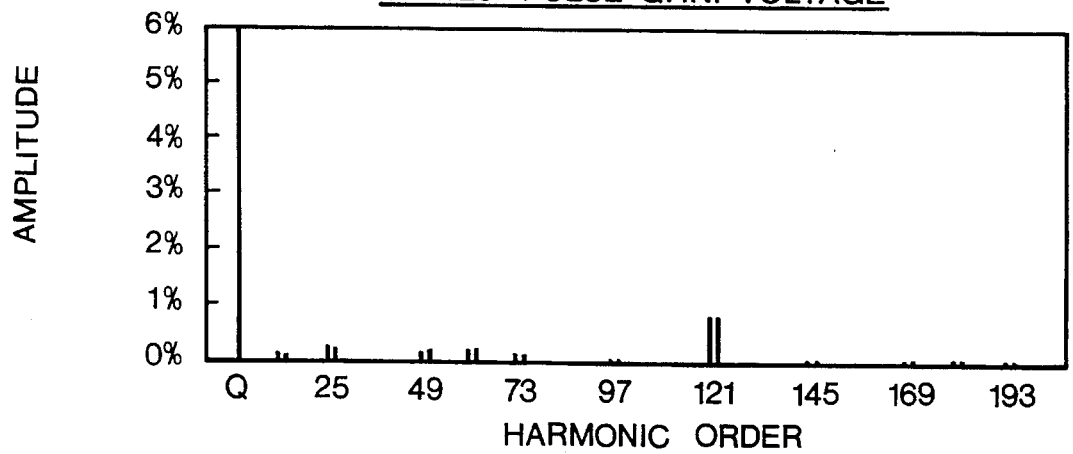
FIG. 33 is a graph of the harmonic spectrum of the output voltage of the 120-pulse QHNI system of FIG. 30.

The 120-pulse QHNI 500 uses the IPT bank 550 to hierarchically combine ten sets of 12-pulse inputs. As shown in FIG. 31, two sets of five inputs from the inverter 502 are received by the first stage 572 of each IPT 552–562, with a 6° displacement between adjacent input waveforms. The voltage waveforms between the first and second IPT stages 572 and 580, that is the voltage waveforms of conductors 582 and 584, have a 15° displacement from one another. In this manner, the 120-pulse QHNI system 500 provides an almost ideal 120-pulse output, with the resulting output voltage waveform provided to the AC grid 54 being shown in FIG. 32. As can be seen from a comparison of the QHNI voltage output waveforms of FIGS. 20, 25, 28, and 32 for the respective 24-pulse QHNI system 270, the 48-pulse QHNI system 340, the 72-pulse QHNI system 400 and the 120-pulse QHNI system 500, it is apparent that as the number of pulses for each QHNI increases, the voltage waveforms smooth out and more closely approximate a sinusoidal output. The harmonic spectrum of the 120-pulse QHNI voltage output of system 500 is shown in FIG. 33, with virtually all of the harmonics under the 119th harmonic being virtually eliminated.

QHNI Systems with Harmonic Blockers

Figure 34:
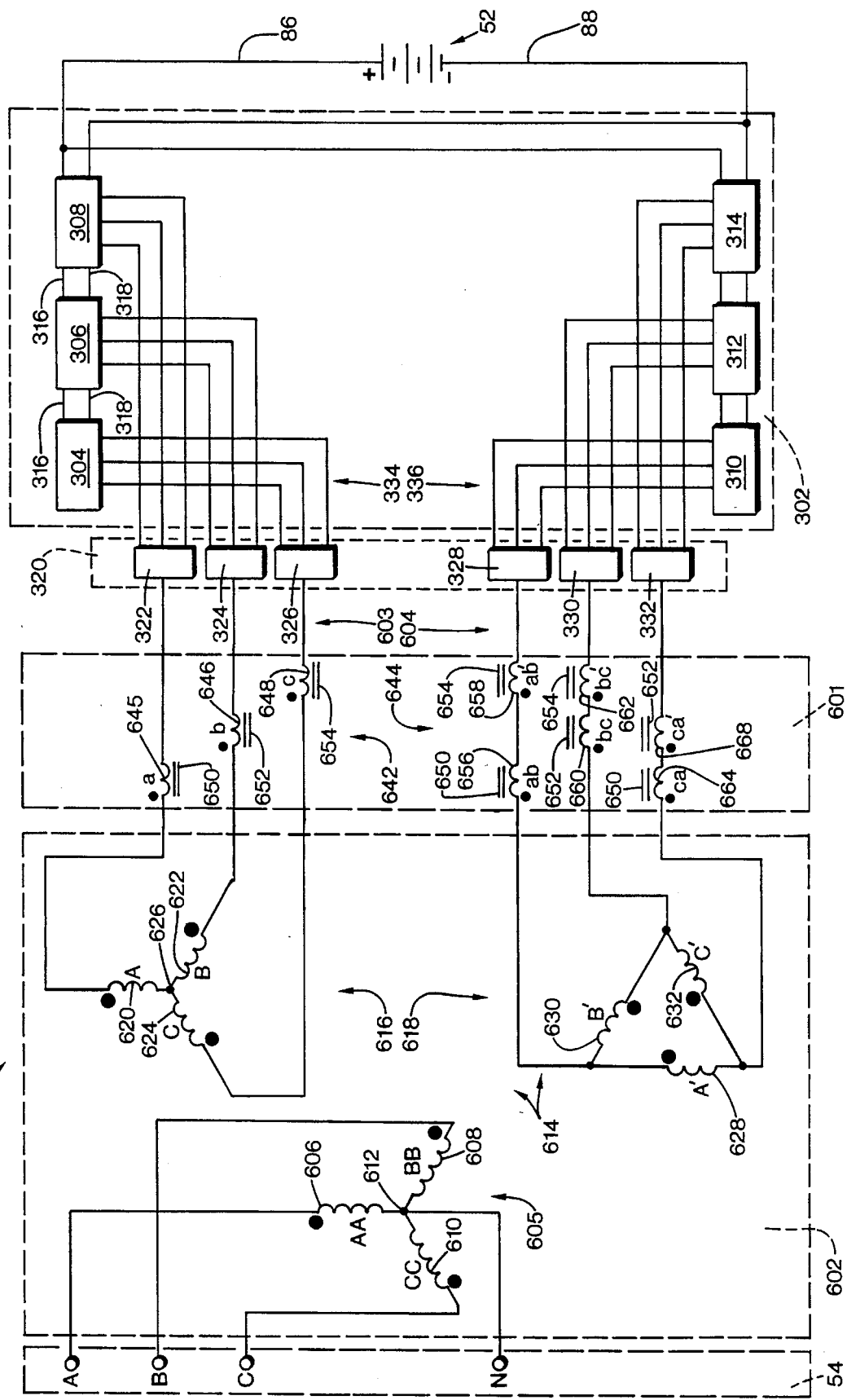
FIG. 34 is a schematic block diagram of an alternate form of a 36-pulse QHNI system including a harmonic blocker of the present invention.

Referring to FIG. 34, an illustrated simplified alternate embodiment of a 36-pulse quasi-harmonic neutralized inverter (QHNI) system 600 constructed in accordance with the present invention has a harmonic blocking device or harmonic blocker 601 coupled to a main transformer 602. The 36-pulse QHNI system 600 has the six section inverter 302 and IPT bank 320 as described above with reference to FIG. 22. Two sets of conductors 603 and 604 couple the harmonic blocker 601 to the IPT bank 320.

The main transformer 602 has grounded wye connected secondary windings 605 (using an inverter engineer's terminology as mentioned above). The wye windings 605 include phase AA windings 606, phase BB windings 608, and phase CC windings 610, all joined together at a neutral point 612. The secondary windings 605 of the main transformer 602 are coupled to the AC grid 54.

The main transformer 602 has primary windings 614 comprising a set of wye connected windings 616 and a set of delta connected windings 618. The primary wye windings 616 include phase A windings 620, phase B windings 622, and phase C windings 624, all joined together at an ungrounded neutral point 626. The primary delta windings 618 include phase A' windings 628, phase B' windings 630 and phase C' windings 632. The cores of the main transformer 602 are omitted for clarity, but each phase of the windings may be wound in a conventional manner on a single core.

If the main transformer 602 were coupled directly to an inverter, such as the two section inverter 70 of FIG. 11, undesirable 5th and 7th harmonic current components would circulate in the primary delta windings 618. Such harmonic circulating currents would disadvantageously cause heating ($I^2R$) losses and the like, which decrease the overall efficiency of the system. The harmonic blocker 601 is used to prevent this undesirable circulation of the 5th and 7th harmonic current components in the primary delta windings 618.

Figure 35:
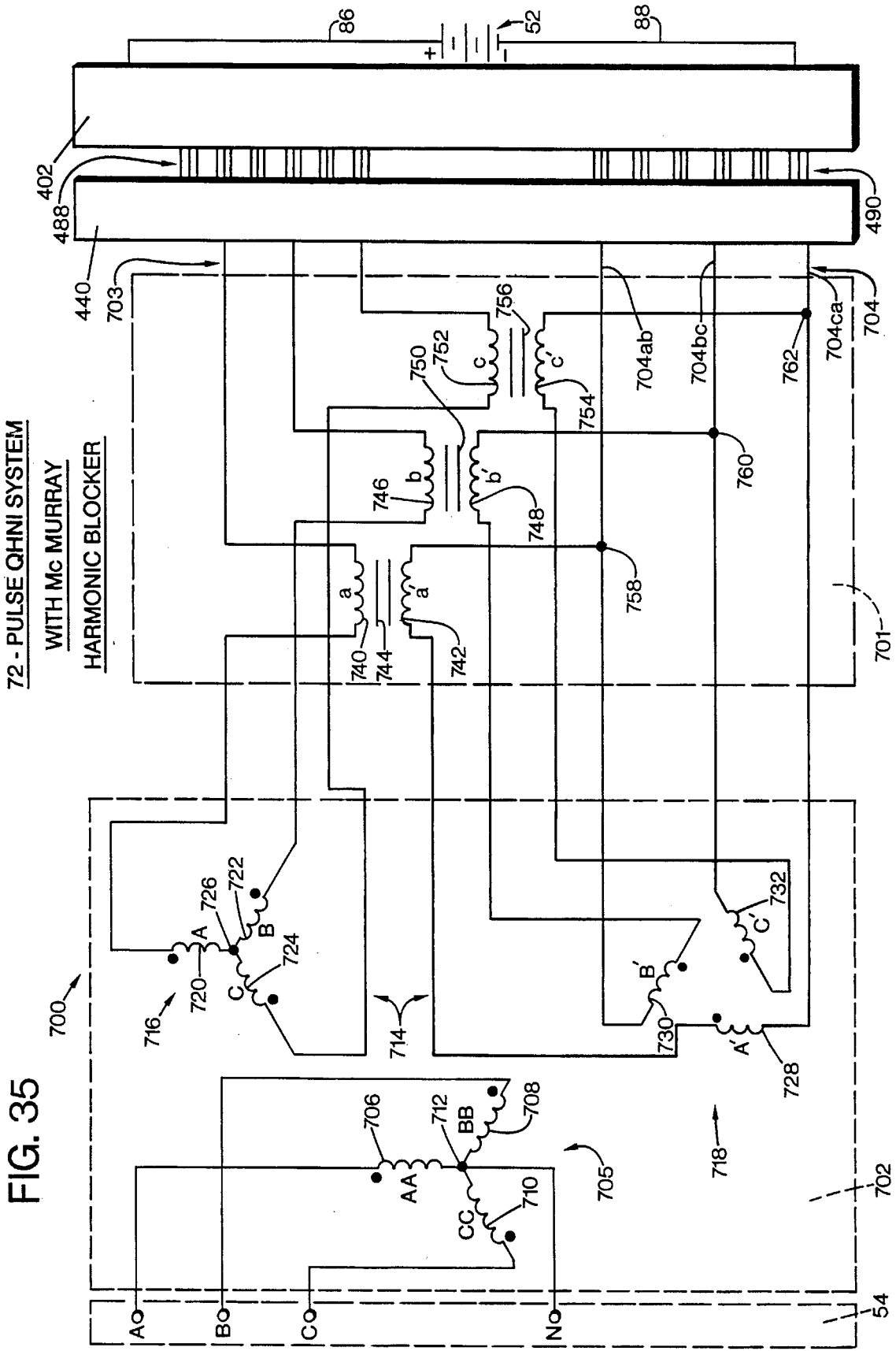
FIG. 35 is a schematic block diagram of an alternate form of a 72-pulse QHNI system including an alternate harmonic blocker of the present invention.

One suitable harmonic blocker is disclosed in U.S. Pat. No. 3,792,286 to Meier and is illustrated in FIG. 34. Another suitable harmonic blocker is disclosed in a co-pending U.S patent application to McMurray, which was filed concurrently with this application for letters patent. The McMurray harmonic blocker is illustrated in FIG. 35, described further below.

The Meier harmonic blocker 601 has a first set of wye blocking coils 642 and a second set of delta blocking coils 644. Although it is generally understood in the art that the terms "windings" and "coils" are synonymous, the term "coils" when used herein will refer to the windings of the harmonic blocker 601. For convenience, occasionally the term "winding" is used herein to refer to the harmonic blocker coils, particularly when referring to them in conjunction with the main transformer windings.

The wye coils 642 of the Meier harmonic blocker 601 are coupled in series with the primary wye windings 616 of the main transformer 602. The wye blocking coils 642 include phase a coils 645, phase b coils 646, and phase c coils 648. As shown in FIG. 34, the phase a blocking coil 645 is in series with the phase A main transformer winding 620. The phase a coil is also in series with the interphase transformer 322. Similarly, the phase b blocking coil 646 couples together the phase B main transformer winding 622 with the interphase transformer 334. Finally, the phase c blocking coil 648 couples together the phase C main transformer winding 624 with the interphase transformer 326.

In the illustrated Meier harmonic blocker 601, the phase a blocking coils 645 are wound on a core 650, the phase b coils 646 are wound on a core 652, and the phase c coils 648 are wound on a core 654. The cores 650–654 may be three single-phase cores, or single legs on a three-legged core.

The Meier harmonic blocker delta coils 644 include three pairs of coils, with one coil pair per phase. Each coil of a pair is wound on a different core. The phase "AB" coil pair includes a phase ab coil 656 wound on core 650, and a phase ab' coil 658 wound on core 654. The phase "BC" coil pair includes a phase bc coil 660 wound on core 652, and a phase bc' coil 662 wound on core 654. The phase "CA" coil pair includes a phase ca coil 664 wound on core 650, and a phase ca' coil 668 wound on core 652.

As shown in FIG. 34, the phase "AB" coil pair is in series with the junction of the phase A' and phase B' primary coils 628 and 630 of the main transformer 602. The phase "AB" coil pair is also in series with the interphase transformer 328. Similarly, the phase "BC" coil pair couples together the junction of the phase B' and phase C' main transformer coils 630 and 632 with the interphase transformer 330. Finally, the phase "CA" coil pair couples together the junction of the phase C' and phase A' main transformer coils 632 and 628 with the interphase transformer 332.

Standard dot notation is shown for each of the phase windings of the main transformer 602 and the Meier harmonic blocker 601. The larger dots illustrate the winding orientation for the windings of the main transformer 602, while the smaller dots adjacent the blocking coils illustrate the coil polarities of the harmonic blocker 601. Each phase of the harmonic blocker coils are wound to allow the fundamental component to flow therethrough, while blocking the 5th and 7th harmonic components. Thus, the Meier harmonic blocker 601 advantageously substantially eliminates the 5th and 7th harmonics from the AC output supplied to the AC grid 54.

Referring to FIG. 35, an illustrated alternate simplified 72-pulse quasi-harmonic neutralized inverter (QHNI) system 700 constructed in accordance with the present invention has a McMurray harmonic blocker 701 and a main transformer 702. The 72-pulse QHNI system 700 also has a two-stage IPT bank 440 and a 12-section inverter 402, as described above with respect to FIG. 27. The two-stage IPT bank 440 is coupled to the McMurray harmonic blocker 701 by conductors 704 and 704.

The main transformer 702 has grounded wye connected secondary windings 705 (using an inverter engineer's terminology as mentioned above). The wye windings 705 include phase AA windings 706, phase BB windings 708, and phase CC windings 710, all joined together at a neutral point 712. The secondary windings 705 of the main transformer 702 are coupled to the AC grid 54.

The main transformer 702 has primary windings 714 comprising a set of wye connected windings 716 and a set of open delta windings 718. The primary wye windings 716 include phase A windings 720, phase B windings 722, and phase C windings 724, all joined together at an ungrounded neutral point 726. The primary open delta windings 718 include phase A' windings 728, phase B' windings 730 and phase C' windings 732. The cores of the main transformer 702 are omitted for clarity, but each phase of the windings may be wound in a conventional manner on a single core.

If the main transformer 702 were coupled directly to an inverter, such as the two section inverter 70 of FIG. 11, and the delta windings 718 were "closed," such as windings 618 in FIG. 34, then undesirable 5th and 7th harmonic current components would circulate in the primary delta windings 718. These harmonic circulating currents cause undesirable heating ($I^2R$) losses and the like, which decrease the overall efficiency of the system. The McMurray harmonic blocker 701 prevents circulation of the 5th and 7th harmonic current components in the primary delta windings 718.

The illustrated McMurray harmonic blocker 701 has three sets of blocking coils, one for each phase. The first set has a phase a blocking coil 740 and phase a' blocking coil 742 wound on a core 744. The second set of blocking coils has a phase b coil 746 and phase b' coil 748 wound on a core 750. The third set of blocking coils has a phase c coil 752 and phase c' coil 754 wound on a core 756. The cores 744, 750 and 756 may be three single-phase cores, or single legs on a three-legged core.

The nonprimed blocking coils 740, 746 and 752 are coupled in series with the primary wye windings 716 of the main transformer 702. These nonprimed blocking coils 740, 746 and 752 are also referred to herein as the "wye" blocking coils. The primed blocking coils 742, 748 and 754 are coupled in series with the primary delta windings 718 of the main transformer 702. These primed blocking coils 742, 748 and 754 are also referred to herein as the "delta" blocking coils.

Referring also to FIG. 27, the phase a coil 740 couples the phase A main transformer winding 720 to the interphase transformer 444 of the transformer bank 440. The phase b coil 746 couples the phase B main transformer winding 722 to interphase transformer 446. The phase c coil 752 couples the phase C main transformer winding 724 to interphase transformer 448.

The phase a' blocking coil 742 is in series with the phase A' main transformer winding 728, the phase b' blocking coil 748 is in series with the phase B" main transformer winding 730, and the phase c' blocking coil 754 is in series with the phase C' main transformer winding 732. The delta connection of the primary windings 718 is completed at the ab, bc and ca junctions 758, 760 and 762, which may be either internal or external to the harmonic blocker 701. The junction 758 couples together the "A" and "B" phases, junction 760 couples together the "B" and "C" phases, and junction 762 couples together the "C" and "A" phases. Referring also to FIG. 27, conductor 704*ab* couples the ab junction 758 with interphase transformer 450 of the IPT bank 440. The conductor 704*bc* couples the bc junction 760 with interphase transformer 452, and conductor 704*ca* couples the ca junction 762 with interphase transformer 454 of the IPT bank 440.

Using the simplified main transformer 602 or 702 with a Meier or McMurray harmonic blocker, 601 or 701, in place of a conventional main transformer 56 provides various simplification advantages and cost savings in some applications by eliminating the need for the wye primary windings 68 shown in FIG. 11. The output voltage waveforms and harmonic spectrums of 36-pulse QHNI system 600 and the 72-pulse QHNI system 700 are the same as described above with respect to the 36-pulse QHNI system 300 and the 72-pulse QHNI system 400, respectively. It is apparent that either the combination of main transformer 602 and the Meier harmonic blocker 601, or the combination of main transformer 702 and the McMurray harmonic blocker 701, may also be substituted for the main transformer 56 in alternate 24-pulse, 48-pulse, and 120-pulse QHNI systems (not shown) to realize simplification advantages and cost savings in certain implementations. Adding either a Meier harmonic blocker 601 or a McMurray harmonic blocker 701 to a single standard utility-type main transformer 602 or 702 simplifies implementing the systems described herein because standard readily available main transformers may be used. Other harmonic blockers known by those in the art to be structurally equivalent to the Meier and McMurray blockers may be substituted therefore.

Harmonic Blocking with Notched Waveforms

Referring to FIG. 36, an alternative to the harmonic blockers, such as Meier and McMurray 601 and 701, comprises eliminating selected harmonics from the AC output power. These harmonics are eliminated by supplying a fixed pattern notched waveform to the main transformer 54, 602 or 702. This fixed pattern notched waveform is supplied by controlling the inverter switches 84 to produce appropriately located notches in the inverter pole output voltage waveforms. For example, the notched square wave of FIG. 36 has a single notch in each quadrant or quarter waveform, beginning after a duration of $D_1$ and ending after a duration of $D_2$ from the square wave edges. In this embodiment, a $D_1$ duration of 16.245° and a $D_2$ duration of 22.065° substantially eliminates the fifth and seventh harmonics, so the harmonic blockers 601 or 701 would not be required. The notched waveforms may be staggered as described above to greatly reduce other higher order harmonics.

One disadvantage of using a notched waveform to eliminate harmonics is the increased switching frequency and increased losses in the inverter poles. The decision as to whether to employ a harmonic blocker, notched waveforms, both or neither is an economic tradeoff particular to each implementation. Given the present state of solid state power switching technology, the fixed pattern notched waveform technique of FIG. 36 may be preferred for lower power applications.

Alternate Embodiments

In some implementations, the inverters and IPT banks of FIGS. 19, 22, 24, 27, 30, 34 or 35 may be combined into a single waveform combining inverter. For example, referring to FIG. 22, the 36-pulse QHNI system 300 may be comprised of the main transformer 56 coupled to a 36-pulse waveform combining inverter 770. The waveform combining inverter 770 includes the inverter 302 and the IPT bank 320. A separate waveform combining inverter may be particularly advantageous for use with a conventional utility or substation transformer as the main transformer 56, for example, for transformers rated 60 MVA (megavolt amperes) or greater. However, for airborne or smaller rated utility implementations, the inverter system may best be supplied as an entire system including an inverter, an IPT bank, and a main transformer 56 or a combination of a main transformer and a harmonic blocker, such as 602 and 601, or 702 and 701.

The technique illustrated herein of combining displaced sets of waveforms to reduce or eliminate undesirable harmonics may be effectively employed with any type of inverter or converter. For example, the inverter or converter may be a pulse-width modulated, fixed pattern notched, classical multi-phase harmonic neutralized, a hybrid thereof, or one producing imperfect fundamental outputs to the IPT bank. This technique of combining the displaced sets of waveforms is not restricted to 6-pulse or 12-pulse systems, but may be also used with other systems, such as three 6-pulse inverters combined into an 18-pulse system, or two 18-pulse inverters combined into a 36-pulse system. For such an 18-pulse QHNI system (not shown), a 20° angle of displacement between the waveforms provided by the inverter may be combined by an IPT bank, whereas a 36-pulse QHNI system (not shown) would have adjacent waveforms displaced by an angle of 10°.

Furthermore, the inverter may be a pulse width modulated inverter, a fixed pattern notched inverter, a classical multi-pulse harmonic neutralized inverter, or some hybrid combination thereof. The present invention may be used with any type of main transformer. It is apparent that the highest quality output voltage waveforms supplied to the AC grid 54 are obtained when the selected displacement results in the maximum attenuation of the dominant harmonics based upon the number of inputs provided by the inverter to the IPT bank for combination.

For example, for maximum attenuation of a 72-pulse QHNI system, a displacement of 10° attenuates the 11th and 13th harmonics by a factor of roughly 10%, and a 15° angle of displacement attenuates the 11th and 13th harmonics still further, as well as the 23rd, 25th and other harmonics up to the 71st harmonic component (see FIG. 29). Furthermore, cost savings may be realized using the hierarchial IPT banks because with a modular approach where each modular transformer must support the same current and voltage between the IPT bank's average output and the inverter pole having the largest displacement.

The AC output voltage waveform supplied to the grid 54 may be optimized for any number of inputs from the inverter to the IPT bank or any number of inverter sections. However, if the number of inputs to the from inverter to the IPT bank is not prime, a much better overall resulting output waveform to the AC grid 54 may be obtained. This better resulting output waveform may sometimes be obtained by combining the inputs in two or more hierarchial displaced sets of waveforms using the IPT bank.

The selection of which QHNI system to use for a particular implementation will depend upon the various parameters of the implementation. For example, for high power systems up to 80 MVA, the 24-pulse QHNI system 270 of FIG. 19 may be the best suited. Such a 24-pulse QHNI system 270 would include two 15° displaced 12-pulse groups of inverters, as shown in FIG. 19, and a conventional wye/wye power transformer 58 and a delta/wye power transformer 60 which may be arranged into the main transformer 56. Significant cost reduction may result if the main transformer 56 is by either the main transformer 602 and the Meier harmonic blocker 601, or the main transformer 702 and the McMurray harmonic blocker 701 in the 24-pulse QHNI system. The harmonic blockers 601 and 701 prevent circulation of the undesirable 5th and 7th harmonic current components as described above.

For implementations in larger power systems, for example up to 320 MVA, the 72-pulse QHNI system 400 of FIG. 27 may be preferred. The 72-pulse QHNI system 400 virtually eliminates all of the residual harmonics less than the 71st. Alternatively, the simplified 72-pulse QHNI system 700 of FIG. 35 may also be used to obtain the cost reductions inherent with the use of a harmonic blocker. Either the Meier harmonic blocker 601 in conjunction with main transformer 602, or the McMurray harmonic blocker 701 in conjunction with main transformer 702, are suitable, as well as their structural equivalents known to those skilled in the art. For either the 72-pulse QHNI system 400 or the simplified 72-pulse QHNI system 700, the second stage IPTs 444–454 hierarchically combine two sets of three inputs to each first stage IPT 458–482 received from the inverter 402. The sets of three inputs from the inverter poles to each of the first stage IPTs 458–482 are displaced by 10°. The intermediate waveforms on conductors 484 and 486 between the first and second IPT stages 456 and 442 are displaced by 15°.

For systems larger than 320 MVA, a simplified 120-pulse QHNI system (not shown) having a harmonic blocker coupled to the twenty section inverter 502 and the IPT bank 550 may be preferred. Either the Meier harmonic blocker 601 in conjunction with main transformer 602, or the McMurray harmonic blocker 701 in conjunction with main transformer 702, are suitable, as well as their structural equivalents known to those skilled in the art. Such an embodiment may be the most cost effective implementation to produce an almost ideal 120-pulse output voltage waveform, such as that shown in FIG. 32. Such an arrangement combines ten sets of 12-pulse inputs using hierarchial displacements of 6° between the waveforms supplied to the first stage IPTs, such as IPTs 574 and 576 of FIG. 31, and a 15° displacement between the intermediate waveforms, for example the waveforms carried by conductors 582 and 584.

One of the most significant advantages of the technique and systems described herein is that very high quality output voltage and input current waveforms are supplied to the AC grid 54. These high quality waveforms are supplied to the AC grid through the reactance of the main transformers 56, 602 or 702. These high quality waveforms are fabricated or produced using relatively simple transformer configurations, both for the main transformers 56, 602 or 702, and for the interphase transformers. Furthermore, because the inverter poles 80 operate at the fundamental frequency (e.g., 60 Hz in the United States, and 50 Hz in Europe), switching losses of the GTOs 84 are much lower than those encountered in earlier inverters using pulse width modulation (PWM) techniques. Additionally, the technique described herein may be readily incorporated into large inverters, such as those on the order of 300–1000 MVA, using the modular interphase transformers, such as shown in FIGS. 14–18, as well as center-tapped IPTs shown in FIGS. 12–13. Moreover, the technique described herein allows for optimization of the output waveform for any number of inverter sections, such as inverter sections numbering five, six, seven, eight or nine.

Method of Operation

The present invention also includes a method of inverting DC power into AC power which is illustrated with respect to the embodiments described above. For example, referring to the 48-pulse QHNI system 340 of FIG. 24, the method includes the step of generating two or more discretely displaced output voltage waveforms from the DC power input 52 using the inverter 342. In this example, four waveforms are generated, such as the waveforms A, B, C and D of FIG. 3 with a 7.5° displacement therebetween. In a combining step, the IPT bank 370 combines the four discretely displaced output voltage waveforms into a combined waveform, such as the average of A, B, C and D shown in FIG. 3. As shown in FIG. 26, the four waveforms are combined to greatly reduce selected harmonic components from the AC power output supplied to the grid 54. The main transformer 56 transforms the combined waveform received from the IPT bank 370 into an AC power output which is supplied to the AC grid or load 54.

In the illustrated embodiment, the generating step of the method comprises generating two or more output voltage waveforms comprising square waves. Alternatively, the generating step may include generating two or more output voltage waveforms comprising square waves having notches therein, as shown in FIG. 36. The notches occur at selected locations within the waveforms to greatly reduce selected harmonic components from the AC power output.

Also in the illustrated embodiment, the combining step of the method comprises hierarchically combining the output voltage waveforms using a two or more stage inverter, as described above with respect to the IPT bank 440 (FIG. 27), and the IPT bank 550 (FIG. 30). For example, referring to the IPT 570 of FIG. 31, first, groups of two or more of the output voltage waveforms are combined by the first stage IPTs 574 and 576 to provide two intermediate waveforms. The two intermediate waveforms are then combined by the second stage IPT 580 to provide the combined waveform supplied to the main transformer 56.

Further in the illustrated embodiment, the transforming step of the method comprises blocking selected harmonic components, such as the 5th and 7th harmonics, from circulating in the primary delta windings of the main transformer using a harmonic blocker. For example, the Meier harmonic blocker 601 is useful with transformer 602, and the McMurray blocker 601 is useful with the open delta primary transformer 702.

In another illustrated embodiment, the generating step comprises generating a number of output voltage waveforms which is at least six and nonprime. In an alternate example, referring to the 72-pulse QHNI system 400 of FIG. 27, the combining step comprises hierarchically combining the output voltage waveforms using the two stage inverter bank 440. First groups of two or more of the output voltage waveforms are combined using the first IPT stage 456 to provide at least two intermediate waveforms carried by conductors 484, 486. Then the at least two intermediate waveforms are combined by the IPTs of the second stage 442 to provide the combined waveform supplied to the transformer 54.

Conclusion

Having illustrated and described the principles of my invention with respect to the preferred embodiments, it should be apparent to those skilled in the art that my invention may be modified in arrangement and detail without departing from such principles. For example, other inverters, other main transformers, other arrangements of the interphase transformer banks, and other harmonic blockers known to be structural equivalents by those skilled in the art may be substituted for those described herein. I claim all such modifications falling within the scope and spirit of the following claims.

I claim:

1. A voltage sourced inverter system, comprising:

an inverter for coupling to a DC power source, said inverter having a number of poles providing a plurality of inverter output voltage waveforms discretely displaced from one another in a predetermined manner;

a main transformer for providing an AC power output of said inverter system; and a plurality of zig-zag interphase transformers connected between said inverter and said main transformer, each zig-zag interphase transformer including at least three modular transformers, a primary of a first modular transformer including a first primary node connected to said main transformer and a second primary node connected to a secondary of another modular transformer, a secondary of said modular transformer with a first secondary node connected to said inverter and a second secondary node connected to a primary of another modular transformer, such that each zig-zag interphase transformer of said plurality of zig-zag interphase transformers receives at least three inverter output voltage waveforms of said plurality of inverter output voltage waveforms, and generates an average output voltage therefrom for application to said main transformer.

2. The voltage sourced inverter system of claim 1 wherein said inverter has eighteen poles, and said set of zig-zag interphase transformers includes six zig-zag interphase transformers, to provide a thirty-six pulse quasi-harmonic neutralized inverter system.

3. The voltage sourced inverter system of claim 2 wherein at least one of said zig-zag interphase transformers comprises a modular three-input zig-zag interphase transformer.

4. The voltage sourced inverter system of claim 1 wherein said inverter has twenty-four poles, and said set of zig-zag interphase transformers includes at least six zig-zag interphase transformers, to provide a forty-eight pulse quasi-harmonic neutralized inverter system.

5. The voltage sourced inverter system of claim 4 wherein at least one of said zig-zag interphase transformers comprises a modular four-input zig-zag interphase transformer.

6. The voltage sourced inverter system of claim 1 wherein said inverter has thirty-six poles, and said set of zig-zag interphase transformers includes eighteen zig-zag interphase transformers hierarchically arranged into first and second stages which are coupled together, with said first stage comprising twelve zig-zag interphase transformers coupled to said inverter and said second stage comprising six zig-zag interphase transformers coupled to said main transformer, to provide a seventy-two pulse quasi-harmonic neutralized inverter system.

7. The voltage sourced inverter system of claim 1 wherein said inverter has thirty-six poles, and said set of zig-zag interphase transformers includes six zig-zag interphase transformers, with each zig-zag interphase transformer comprising a modular six-input zig-zag interphase transformer, to provide a seventy-two pulse quasi-harmonic neutralized inverter system.

8. The voltage sourced inverter system of claim 1 wherein said inverter has thirty-six poles, and said set of zig-zag interphase transformers includes six interphase transformers, with each zig-zag interphase transformer comprising a six-input zig-zag interphase transformer, to provide a seventy-two pulse quasi-harmonic neutralized inverter system.

9. The voltage sourced inverter system according to claim 1 wherein said inverter has sixty poles, and said set of zig-zag interphase transformers includes six zig-zag interphase transformers, with each zig-zag interphase transformer comprising a ten-input zig-zag interphase transformer, to provide a one-hundred-twenty pulse quasi-harmonic neutralized inverter system.

* * * * *